US009449518B2

(12) United States Patent
Mochizuki et al.

(10) Patent No.: US 9,449,518 B2
(45) Date of Patent: Sep. 20, 2016

(54) DISPLAY CONTROL DEVICE, METHOD, AND NON-TRANSITORY STORAGE MEDIUM

(71) Applicant: Panasonic Intellectual Property Management Co., Ltd., Osaka (JP)

(72) Inventors: Makoto Mochizuki, Kanagawa (JP); Koichi Emura, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/620,882

(22) Filed: Feb. 12, 2015

(65) Prior Publication Data

US 2015/0254983 A1    Sep. 10, 2015

(30) Foreign Application Priority Data

Mar. 6, 2014   (JP) ................................. 2014-043771
Nov. 28, 2014  (JP) ................................. 2014-241727

(51) Int. Cl.
*B60Q 1/00* (2006.01)
*G08G 1/16* (2006.01)
*G06K 9/00* (2006.01)
*G06T 11/20* (2006.01)
*B60R 1/00* (2006.01)

(52) U.S. Cl.
CPC ............... *G08G 1/165* (2013.01); *B60R 1/00* (2013.01); *G06K 9/00362* (2013.01); *G06K 9/00805* (2013.01); *G06T 11/206* (2013.01); *G08G 1/166* (2013.01); *G08G 1/167* (2013.01)

(58) Field of Classification Search
CPC ..................................................... G08G 1/165

USPC ........................................................ 340/435
See application file for complete search history.

(56) References Cited

U.S. PATENT DOCUMENTS 8,121,348 B2 *   2/2012   Hayasaka ............ G06K 9/6203
                                                  348/148
8,493,198 B1 *   7/2013   Vasquez ................ B60Q 9/008
                                                  340/425.5

(Continued)

FOREIGN PATENT DOCUMENTS

JP    2009-117978    5/2009

OTHER PUBLICATIONS

The Extended European Search Report dated Jun. 7, 2016 for the related European Patent Application No. 15154432.7.

*Primary Examiner* — Qutbuddin Ghulamali
(74) *Attorney, Agent, or Firm* — Greenblum & Bernstein, P.L.C.

(57) ABSTRACT

A display control device includes a determiner and a display controller. The determiner determines a recognition accuracy based on a result of a calculator. Based on a result of the determiner, the display controller controls a displayer so as to generate an image that shows a first or second graphic in which a region indicating the direction in which a predetermined object exists is displayed in a mode different from that of another region and so as to display the image on a display medium. The first graphic is generated when it is determined that the recognition accuracy is a first recognition accuracy. The second graphic is generated when it is determined that the recognition accuracy is a second recognition accuracy lower than the first recognition accuracy. A first width of the region in the first graphic is smaller than a second width of the region in the second graphic.

8 Claims, 18 Drawing Sheets

(56) References Cited

U.S. PATENT DOCUMENTS

| | | | |
|---|---|---|---|
| 8,547,249 B2* | 10/2013 | David | G08G 1/166 340/435 |
| 2004/0246114 A1 | 12/2004 | Hahn | |
| 2008/0042812 A1* | 2/2008 | Dunsmoir | G06K 9/00805 340/435 |
| 2011/0234805 A1 | 9/2011 | Matsuda et al. | |
| 2011/0246156 A1 | 10/2011 | Zecha et al. | |
| 2012/0194680 A1 | 8/2012 | Ishii | |
| 2012/0314074 A1 | 12/2012 | Aimura et al. | |
| 2013/0010112 A1 | 1/2013 | Goto et al. | |
| 2013/0235200 A1* | 9/2013 | Giesler | G02B 27/01 348/148 |

* cited by examiner

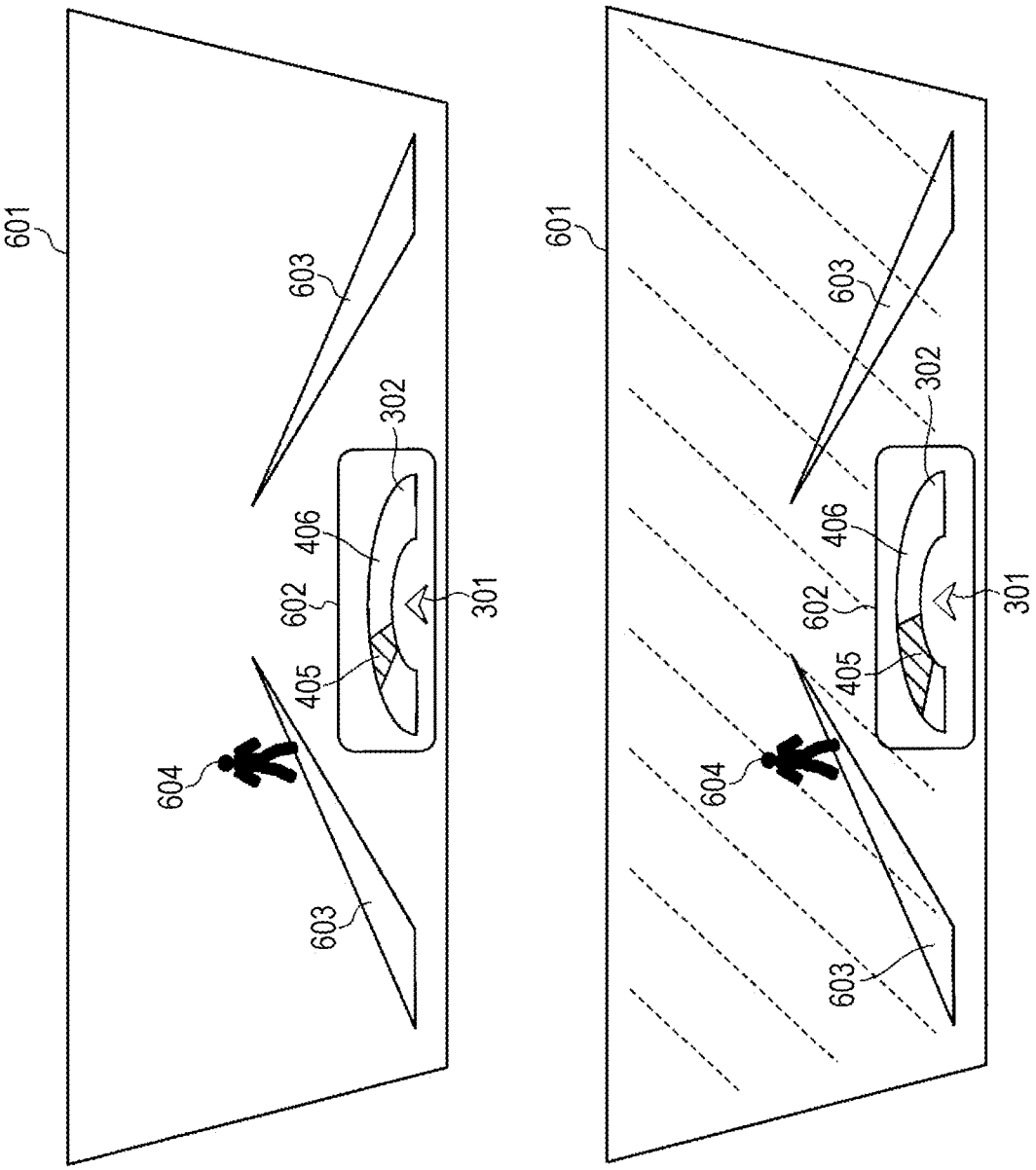

| CONDITION (DEGREE) | DISPLAY DIRECTION (DEGREE) |
|---|---|
| A < −90 | NOT DISPLAYED |
| −90 ≤ A < −30 | −60 (STRAIGHT LINE 701) |
| −30 ≤ A < 30 | 0 (STRAIGHT LINE 702) |
| 30 ≤ A < 90 | 60 (STRAIGHT LINE 703) |
| 90 ≤ A | NOT DISPLAYED |

DISPLAY CONTROL DEVICE, METHOD, AND NON-TRANSITORY STORAGE MEDIUM

BACKGROUND

1. Technical Field

The present disclosure relates to a display control device and a display control method that control display of information provided to an occupant in a vehicle or the like and to a non-transitory tangible storage medium.

2. Description of the Related Art

Recent years have seen active development of a driving assistance system that detects an object (e.g., a vehicle, a pedestrian, a white line, a road sign, or the like) that exists in the surroundings of a vehicle by using a sensor mounted thereon and that presents information to an occupant in the vehicle upon determining that the possibility of collision with the object is high.

In an environment where the vehicle travels, however, there are cases in which the accuracy with which the sensor detects an object in the surroundings of the vehicle changes (this accuracy is hereinafter referred to as "sensing accuracy"). One example of a method for changing information presentation to the occupant in accordance with the sensing accuracy is a technology disclosed in Japanese Unexamined Patent Application Publication No. 2009-117978 (hereinafter referred to as "related art").

In the related art, during display of an image captured by a vehicle-mounted camera, an object included in the image is highlighted according to the degree of reliability of recognition accuracy of the object. This makes it possible to avoid giving the occupant a sense of discomfort due to an event in which information being displayed is suddenly not displayed when the sensing accuracy decreases.

However, although, in the related art, an object is highlighted according to the sensing accuracy, what is displayed is not necessarily easy for the occupant to understand.

SUMMARY

One non-limiting and exemplary embodiment provides a display control device and a display control method that allow an occupant in a movable body to recognize presented information and a sensing accuracy and provides a non-transitory tangible storage medium.

In one general aspect, the techniques disclosed here feature a display control device in a display system including a sensor that detects a predetermined object that exists in surroundings of a movable body, a recognizer that recognizes the predetermined object based on a detection result of the sensor, an image generator that generates a predetermined image, and a displayer that displays a graphic having a predetermined shape on a display medium by outputting the predetermined image onto the display medium. The display control device includes: an obtainer that obtains a recognition result from the recognizer; and a controller that controls, when the recognizer recognizes the predetermined object, the image generator so as to generate the predetermined image that shows the graphic having a predetermined shape when displayed on the display medium, based on the recognition result. The graphic having a predetermined shape is a graphic in which a display mode of a partial region indicating a direction in which the predetermined object exists and a display mode of another region are different from each other. When the predetermined object is a pedestrian, the controller determines whether the pedestrian is a first type or a second type that is younger than the first type. The controller controls the image generator so as to generate a first predetermined image as the predetermined image when the pedestrian is the first type, and controls the image generator so as to generate a second predetermined image as the predetermined image when the pedestrian is the second type. The predetermined image shows, as the graphic having a predetermined shape, a first graphic including a partial region having a first width, and the second predetermined image shows, as the graphic having a predetermined shape, a second graphic including a partial region having a second width that is larger than the first width.

According to the present disclosure, an occupant in a movable body can intuitively recognize presented information and a sensing accuracy.

It should be noted that general or specific embodiments may be implemented as a system, a device, an apparatus, a method, an integrated circuit, a computer program, a non-transitory tangible storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 7A and 7B illustrate examples of an occupant's field of view and a displayed image according to the first embodiment of the present disclosure;

DETAILED DESCRIPTION

In known driving assistance systems, for example, when a camera is used as a sensor, the sensing accuracy may decrease in driving environments, such as at night, in backlight, and in rainy weather. In known driving assistance systems, for example, when a millimeter-wave radar is used as a sensor, the sensing accuracy may also decrease in driving environments where an obstruction that reflects radar waves exists. If information presentation that is the same as typical information presentation is performed for the occupant in spite of the situation in which the sensing accuracy has decreased, there is the possibility that an erroneous warning is issued or no warning is issued. Thus, it is important for the occupant to recognize the decrease in the sensing accuracy. Accordingly, embodiments of the present disclosure allow the occupant to recognize presented information and the sensing accuracy.

First Embodiment

A first embodiment of the present disclosure will be described with reference to the accompanying drawings.

Figure 1:
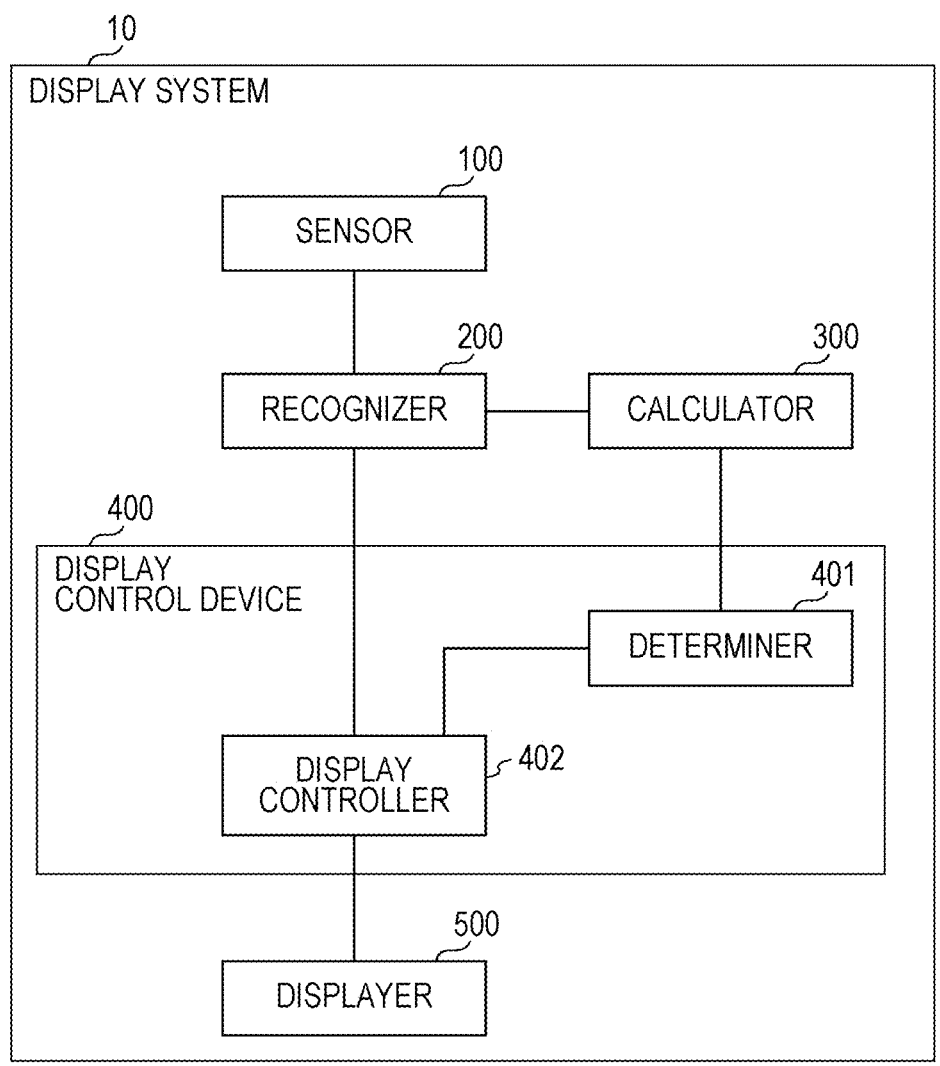
FIG. 1 is a block diagram illustrating an example configuration of a display system according to a first embodiment of the present disclosure.

First, an example configuration of a display system 10 according to the present embodiment will be described with reference to FIG. 1. FIG. 1 is a block diagram illustrating an example configuration of the display system 10 according to the present embodiment.

The display system 10 is used, for example, in a movable body, such as a vehicle. That is, the display system 10 may be vehicle-mounted equipment or may be equipment that is carried into a vehicle. Although a description in the present embodiment will be given assuming that the display system 10 is applied to a vehicle, the movable body is not limited to a vehicle and may be a ship, an airplane, or the like. Although a description in the present embodiment will be given of an example in which a user is an occupant in a vehicle, particularly the driver of a vehicle, the user is not limited thereto. In addition, the display system 10 may also be used for a wearable computer (e.g., an HMD described below) that a user can wear on his or her body.

In FIG. 1, the display system 10 includes a sensor 100, a recognizer 200, a calculator 300, a display control device 400, and a displayer 500. The display control device 400 has a determiner 401 and a display controller 402.

The sensor 100 senses the forward view (the forward field of view) of the driver of the vehicle at predetermined time intervals. The sensor 100 is, for example, a sensing camera. The sensing camera is installed inside or outside the vehicle to capture an image of the forward view of the vehicle. Alternatively, the sensor 100 may be, for example, a radar. The radar is installed inside or outside the vehicle to sense the forward view of the vehicle.

The sensor 100 outputs, to the recognizer 200, forward-view information indicating a result of the forward-view sensing. This outputting is performed, for example, at predetermined time intervals.

On the basis of the forward-view information from the sensor 100, the recognizer 200 recognizes a predetermined object that exists in the surroundings of the vehicle. Examples of the object include a movable body (e.g., a vehicle, a human, a bicycle, or a two-wheeled vehicle), a white line on a road, a sign, a road surface marking, a curb, a guardrail, a traffic light, a utility pole, and a building. For example, when the sensor 100 is a sensing camera, the recognizer 200 performs pattern matching or the like on the forward-view information (e.g., a forward-view image) to recognize an object. Also, for example, when the sensor 100 is a radar, the recognizer 200 extracts an object from the forward-view information through clustering, machine learning, or the like to recognize an object. Since the object recognition technology for the recognizer 200 may be known art, a detailed description thereof is not given hereinafter.

The recognizer 200 outputs recognition result information indicating a recognition result of the object to the calculator 300 and the display controller 402 in the display control device 400. The recognition result information includes, for example, the position (X, Y) where an object exists, the angle of an object relative to the traveling direction of the vehicle (this angle is hereinafter referred to simply as a "relative angle"), the speed of the vehicle relative to an object (this speed is hereinafter referred to simply as a "relative speed"), an object type, information obtained by pattern matching, and information obtained by object tracking processing. The position (X, Y) where an object exists represents coordinates in a camera coordinate system in which X indicates a horizontal direction, and Y indicates a forward direction, with reference to the point where the sensing camera of the vehicle is installed. Y of the position (X, Y) where an object exists also indicates the distance between the vehicle and the object in the vehicle traveling direction (this distance is hereinafter referred to simply as "distance").

The calculator 300 calculates a recognition accuracy of the sensor (which may also be referred to as "sensing accuracy" and is hereinafter referred to simply as "recognition accuracy"). The calculator 300 may also calculate the sensing accuracy on the basis of the recognition result from the recognizer 200 or may also calculate the sensing accuracy without using the recognition result obtained by the recognizer 200. A description will be given below in detail.

The calculator 300 calculates the sensing accuracy, for example, on the basis of the recognition result from the recognizer 200. More specifically, the calculator 300 calculates the recognition accuracy on the basis of a difference between a forward-view image obtained during the pattern matching and a pre-stored template. In this case, for example, when the difference between the image of the object captured by the camera and the pre-stored template is small, the calculator 300 calculates the recognition accuracy such that the value thereof is large. Alternatively, for example, the calculator 300 calculates the recognition accuracy on the basis of the number of frames obtained during processing for tracking an object (e.g., a moving object)

between different image frames. In this case, for example, the calculator 300 performs the calculation such that the larger the number of frames is, the larger the value of the recognition accuracy becomes. Even when the tracking processing is successful, if the results of the object detection vary greatly between frames, there is the possibility that the recognition accuracy is low. Thus, the calculator 300 may perform the calculation such that, for example, the larger the amount of change in the detection results (the distances, the relative speeds, or the like) between frames is, the lower the recognition accuracy becomes. Also, when a device other than a camera is used as the sensor, features according to a sensor type corresponding to the aforementioned difference between the forward-view image and the template may be used for the recognition accuracy calculation.

The calculator 300 may also calculate the recognition accuracy, for example, on the basis of a recognition result of the vehicle driving environment. For example, when the sensor 100 is a sensing camera, the recognizer 200 performs predetermined image processing on the forward-view image of the vehicle captured by the sensing camera to recognize whether or not the driving environment is a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel). When the recognizer 200 recognizes that the driving environment is a driving environment in which the recognition accuracy is likely to decrease, the calculator 300 calculates a smaller value for the recognition accuracy.

Figure 2:
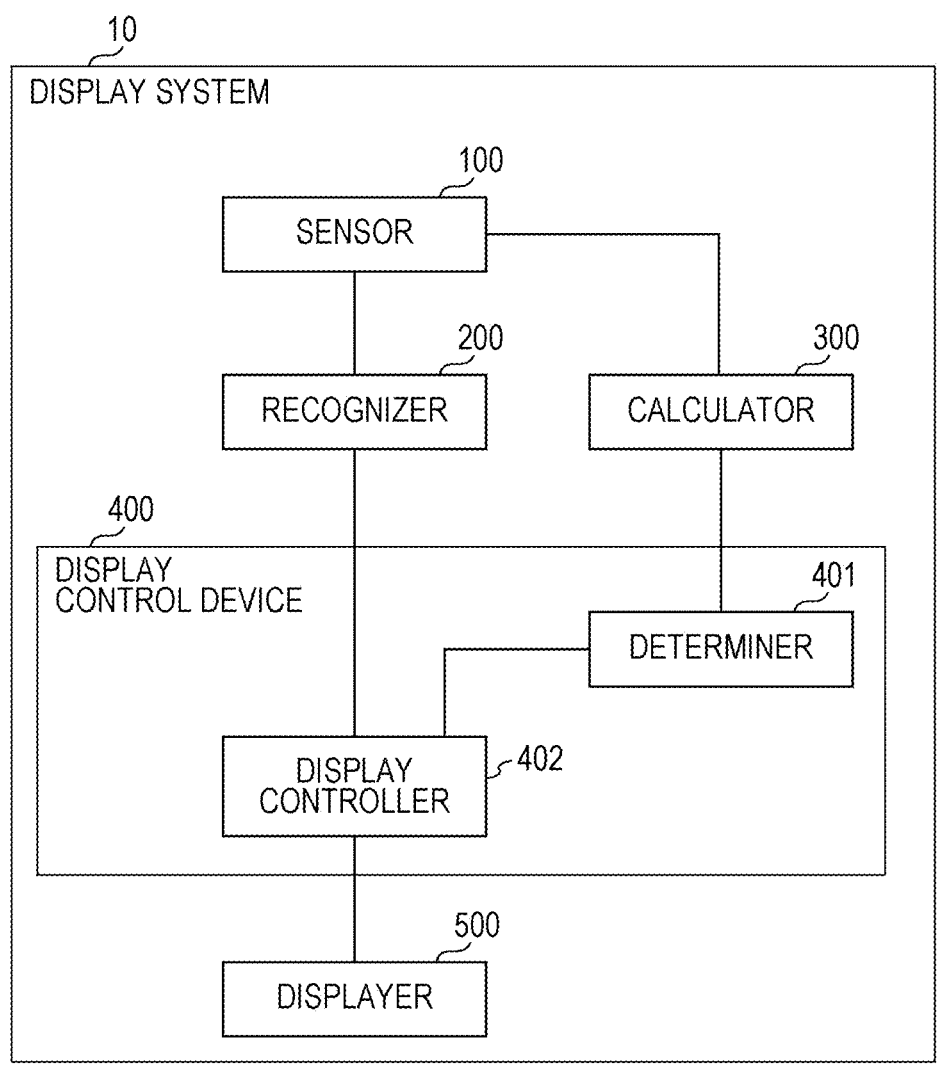
FIG. 2 is a block diagram illustrating an example configuration of the display system according to the first embodiment of the present disclosure.

The calculator 300 may also calculate the recognition accuracy, for example, without using the recognition result from the recognizer 200. An example in this case will now be described with reference to FIG. 2. In FIG. 2, constituent elements that are the same as or similar to those in FIG. 1 are denoted by the same reference numerals, and descriptions thereof are not given hereinafter. In FIG. 2, for example, when the sensor 100 is a sensing camera, the calculator 300 receives a forward-view image of the vehicle from the sensor 100. When the forward-view image of the vehicle includes information indicating that the driving environment is a driving environment in which the recognition accuracy is likely to decrease (e.g., information indicating that the vehicle is traveling in bad weather, such as in rain, fog, sleet, hail, or snow, information indicating that the illuminance in the surroundings of the vehicle is increased due to backlight, the headlights of an oncoming vehicle, or the like, or information indicating that the illuminance in the surroundings of the vehicle is reduced due to traveling at night or in a tunnel), the calculator 300 calculates a small value for the recognition accuracy.

In FIG. 2, the sensor 100 may be replaced with another sensor (e.g., a sensor that is substantially the same as a sensor 101 described below in a second embodiment). This sensor is, for example, a raindrop sensor or an illuminance sensor and can detect a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel).

The calculator 300 receives, from the sensor, information indicating a detection result. When the detection result indicates that the driving environment is a driving environment in which the recognition accuracy is likely to decrease, the calculator 300 calculates a small value for the recognition accuracy.

The calculator 300 then outputs recognition accuracy information indicating the recognition accuracy value to the determiner 401 in the display control device 400.

On the basis of the recognition result information from the calculator 300 and a pre-defined threshold, the determiner 401 determines whether the recognition accuracy is high or low. For example, when the recognition accuracy value indicated by the recognition result information is larger than or equal to the threshold (or is larger than the threshold), the determiner 401 determines that the recognition accuracy is a high accuracy. On the other hand, for example, when the recognition accuracy value indicated by the recognition result information is smaller than the threshold (or is smaller than or equal to the threshold), the determiner 401 determines that the recognition accuracy is a low accuracy.

The determiner 401 then outputs determination result information indicating the determination result to the display controller 402.

On the basis of the determination result information from the determiner 401, the display controller 402 determines a width (hereinafter referred to as a "display width") at which a highlighted region is to be displayed in a pre-defined detection range graphic. The term "detection range graphic" as used herein refers to information of an image having a predetermined shape and schematically showing a detection range of the sensor 100, and is pre-stored by the display controller 402 (or a storage unit, not illustrated). Details of the detection range graphic are described later with reference to FIG. 4. The highlighted region refers to a region displayed highlighted in the aforementioned detection range graphic and is, for example, a region indicating the direction in which an object exists. The highlighted region may be displayed at all times or may be displayed as appropriate. The display width is indicated by, for example, an angle. For example, when the determination result information indicates a high accuracy (one example of a first recognition accuracy), the display controller 402 sets the display width to a first display width. On the other hand, for example, when the determination result information indicates a low accuracy (one example of a second recognition accuracy), the display controller 402 sets the display width to a second display width. The second display width has a larger value than the first display width.

Also, on the basis of the recognition result information from the recognizer 200, the display controller 402 determines a direction in which the highlighted region is displayed in the detection range graphic (this direction is hereinafter referred to simply as a "display direction"). The display direction is indicated by, for example, an angle. A specific example of this determination process is described later with reference to FIG. 5. The display direction can also be called a position where the highlighted region is displayed in the detection range graphic.

On the basis of the determined display width and display direction, the display controller 402 sets the range of the highlighted region in the detection range graphic. A specific example of the setting process is described later with reference to FIG. 5.

The display controller 402 also determines a display mode of the highlighted region and display mode(s) of other region(s) (hereinafter referred to as "non-highlighted region(s)"). The "display mode" as used herein refers to, for example, a coloring method (whether to paint the entire region or paint only the periphery of the region) and the color used in the coloring method, with respect to each of the highlighted region and the non-highlighted region(s).

After determining the display mode, the display controller 402 outputs control information to the displayer 500. The control information is information for controlling the displayer 500 and includes, for example, information about the shape of the detection range graphic, the range of the highlighted region in the detection range graphic, and the display modes.

On the basis of the control information from the display controller 402, the displayer 500 generates graphics (e.g., a detection range graphic and a reference position graphic described below) and projects the generated graphics onto a display (one example of a display medium). An example of display of the graphics is described later with reference to FIGS. 6A to 6D and 7A and 7B. The displayer 500 has a projector function and directly projects a graphic onto the display. Instead of using the projector function, for example, the displayer 500 may display a graphic on the display or may use a hologram. When a hologram is used, a system may be used in which a light guide plate that totally internally reflects and guides a group of parallel light beams that satisfies the total internal reflection condition of a light guide plate is used to emit some of a group of parallel light beams totally internally reflected and guided in the light guide plate, to thereby allow the occupant to view a virtual image. Although image data is not directly projected in a system in which a light guide plate is used, unlike a projector, the description herein is given using the definition "projection" as in the projector system, for convenience of description.

Examples of the display include a liquid-crystal display (LCD), a head-up display (HUD), a head-mounted display or helmet-mounted display (HMD), an eyeglass-type display (smart glasses), a display for navigation, a meter display, and other dedicated displays. The HUD may be, for example, the windshield of the vehicle or a glass surface, a plastic surface, or the like that is additionally provided. For example, the windshield may be the front glass or may be a side window glass or the rear window glass of the vehicle.

The display system 10 may have a configuration including the above-described display.

The aforementioned graphics (e.g., the detection range graphic and a reference position graphic described below) may be generated by the display control device 400 or another constituent element (not illustrated), not the displayer 500.

For example, the driver of the vehicle views, as a virtual image, the graphics (e.g., the detection range graphic and a reference position graphic described below) generated by the display system 10. In this case, the graphics may be projected onto the display so as to be superimposed on the driver's field of view. Since the principle that a driver views a graphic projected on a display as a virtual image is known art, a description thereof is not given herein.

Figure 3:
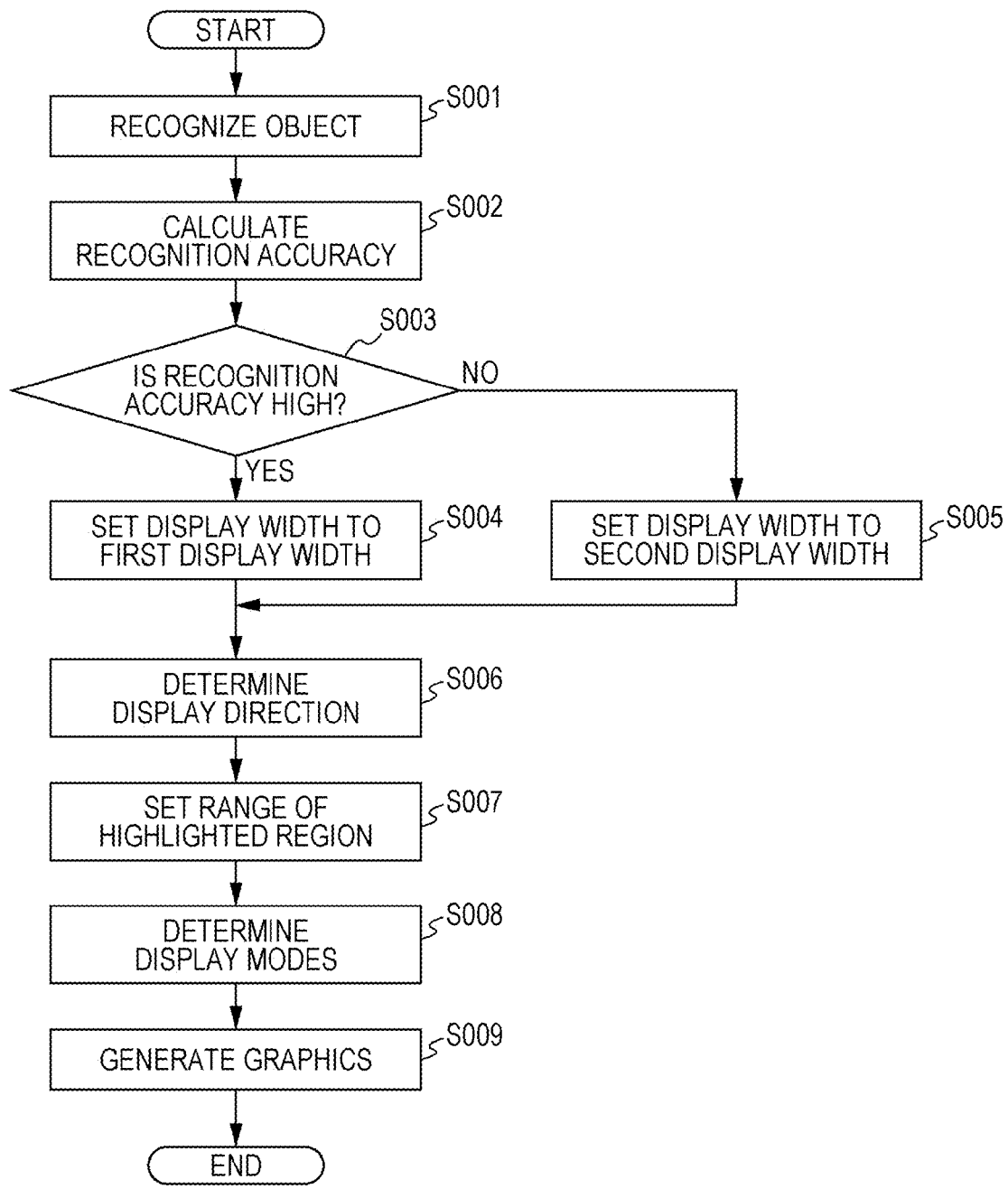
FIG. 3 is a flowchart illustrating an example operation of the display system according to the first embodiment of the present disclosure.

Next, an example operation of the display system 10 according to the present embodiment will be described with reference to FIG. 3. FIG. 3 is a flowchart illustrating an example operation of the display system 10 according to the present embodiment. The flow in FIG. 3 is executed, for example, at predetermined operation intervals, such as at intervals of 30 milliseconds or 100 milliseconds. For example, when the sensor 100 is a sensing camera, and the forward-view information is output to the recognizer 200 with a frame rate of 15 fps, 30 fps, or the like, the flow in FIG. 3 may be executed according to the output intervals.

In step S001, the recognizer 200 recognizes an object that exists in the surroundings of the vehicle, on the basis of the forward-view information from the sensor 100.

In step S002, the calculator 300 calculates the recognition accuracy on the basis of the recognition result information from the recognizer 200.

In step S003, the determiner 401 determines whether the recognition accuracy is high or low, on the basis of the recognition result information from the calculator 300 and a pre-defined threshold. That is, if the recognition accuracy value indicated by the recognition result information is larger than or equal to the threshold, the determiner 401 determines that the recognition accuracy is a high accuracy (YES in step S003). In this case, the flow proceeds to step S004. On the other hand, if the recognition accuracy value indicated by the recognition result information is smaller than the threshold, the determiner 401 determines that the recognition accuracy is a low accuracy (NO in step S003). In this case, the flow proceeds to step S005.

If the determination result information from the determiner 401 indicates a high accuracy, in step S004, the display controller 402 sets the display width to a first display width. The first display width has a value smaller than the second display width and is, for example, 5 degrees.

If the determination result information from the determiner 401 indicates a low accuracy, in step S005, the display controller 402 sets the display width to a second display width. The second display width has a value larger than the first display width and is, for example, 10 degrees.

The display widths and the recognition accuracies are associated with each other in advance, and these associations are stored by the display controller 402. Hence, in steps S004 and S005 described above, the display controller 402 determines the first display width or the second display width on the basis of the associations and the recognition accuracy indicated by the determination result information.

In step S006, the display controller 402 determines a display direction on the basis of the recognition result information (e.g., the relative angle) from the recognizer 200. A specific example of this determination process is described later with reference to FIG. 5.

Figure 4:
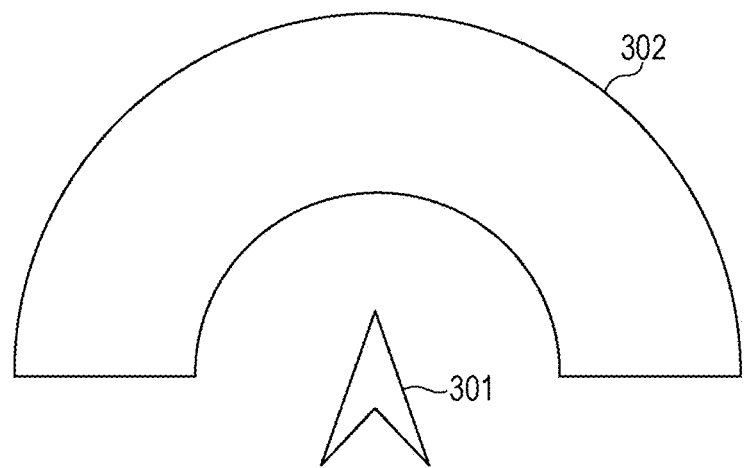
FIG. 4 illustrates a display example of an image according to the first embodiment of the present disclosure.

In step S007, on the basis of the determined first display width or second display width and the determined display direction, the display controller 402 sets the range of the highlighted region in a pre-defined detection range graphic (e.g., a graphic 302 described below and illustrated in FIG. 4). A specific example of this setting process is described below with reference to FIG. 5.

Figure 5:
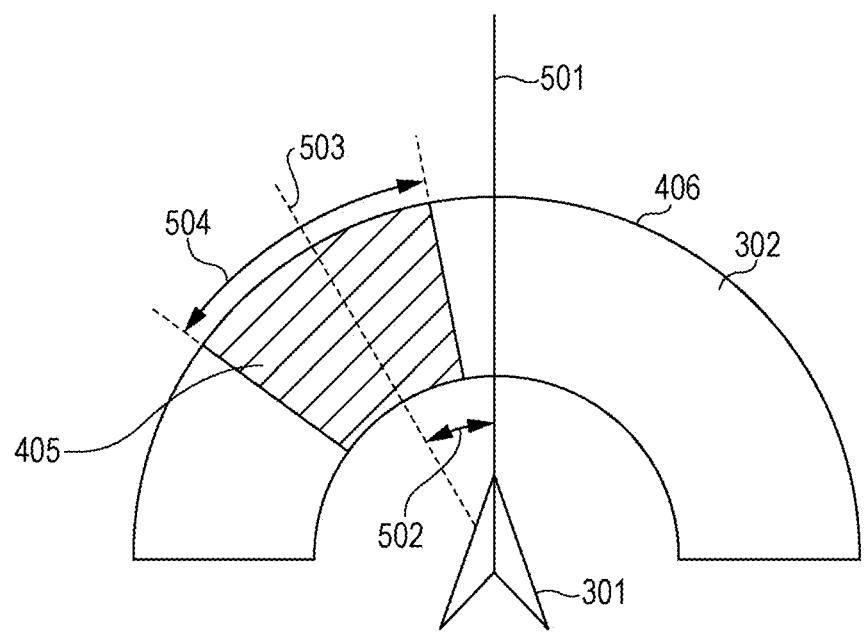
FIG. 5 illustrates an example of setting a highlighted region according to the first embodiment of the present disclosure.

Now, specific examples of the processes in steps S006 and S007 will be described with reference to FIGS. 4 and 5.

First, one example of graphics (e.g., a reference position graphic and the detection range graphic) generated by the display system 10 will be described with reference to FIG. 4. In FIG. 4, a graphic 301 is one example of the reference position graphic and represents a vehicle. Also, a graphic 302 is one example of the detection range graphic and represents the vehicle's surroundings, which is a detection range of the sensor 100 (i.e., a positional relationship between the vehicle and an object). The graphic 301 is used as a reference position during determination of the display direction. The reference position is, for example, the position where the sensor 100 is installed. The range of the highlighted region is set in the graphic 302, based on the determined display width and display direction. The graphic 302 illustrated in FIG. 4 represents a state before the highlighted region is set. The graphic 302 illustrated in FIG. 4 may be displayed on the display at all times or may be displayed on the display as appropriate. The graphics 301 and 302 illustrated in FIG. 4 have default modes and are pre-stored with these modes in the display controller 402 (or a storage unit, not illustrated).

Next, a specific example of the process for the display-direction determination in step S006 and the process for the highlighted-region range setting in step S007 will be described with reference to FIG. 5.

First, a description will be given of a specific example of the process for the display-direction determination. For example, the display controller 402 determines that the display direction is a direction that is offset by an angle 502 from a reference straight line 501 extending from the graphic 301 serving as a reference position (e.g., from the straight line indicating the forward direction Y in the above-described camera coordinate system), that is, is the direction of a straight line 503. The angle 502 is an angle in a horizontal plane measured with reference to the reference straight line 501. The angle 502 represents the direction in which an object exists, and is, for example, the relative angle recognized by the recognizer 200. The angle 502 is measured, for example, with the clockwise direction being positive and the counterclockwise direction being negative from the position of the reference straight line 501 illustrated in FIG. 5. Hence, for example, when the recognizer 200 recognizes a pedestrian at −40 degrees, the display controller 402 can obtain the straight line 503 by rotating the reference straight line 501 counterclockwise by 40 degrees (one example of the angle 502), as illustrated in FIG. 5.

Next, a description will be given of a specific example of the process for the highlighted-region range setting. For example, the display controller 402 sets, in the graphic 302, the range indicated by the display width 504 with reference to the straight line 503 as a highlighted region 405. For example, when the display width 504 is 10 degrees, the display controller 402 rotates the straight line 503 clockwise by 5 degrees about the graphic 301 and sets the position of a resulting straight line (not illustrated) as a first edge. The display controller 402 also rotates the straight line 503 counterclockwise by 5 degrees about the graphic 301 and sets the position of a resulting straight line (not illustrated) as a second edge. The display controller 402 sets a region between the first edge and the second edge in the graphic 302 as the highlighted region 405. The display controller 402 also sets, in the graphic 302, the region(s) other than the highlighted region 405 as non-highlighted region(s) 406.

Specific examples of the process for the display-direction determination and the process for the highlighted-region range setting have been described thus far. Now, the flow returns to the processing in FIG. 3.

In step S008, the display controller 402 determines the display mode of the highlighted region and the display mode of the non-highlighted region(s). Region types (the highlighted region and the non-highlighted region(s)) and the display modes (the coloring methods and colors used therefor) are associated with each other in advance, and the associations are stored by the display controller 402. Thus, in step S008, on the basis of the associations, the display controller 402 determines the display modes of the highlighted region and the non-highlighted region(s).

When the process for the highlighted-region range setting and the process for determining the display modes, as described above, are finished, the display controller 402 outputs, to the displayer 500, control information for performing control so that graphics (e.g., the graphics 301 and 302) are generated and displayed based on the set range of the highlighted region and the determined display modes.

Figure 6A:
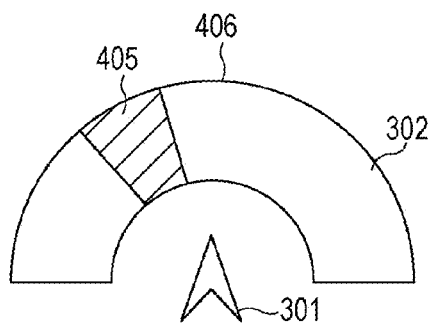
FIGS. 6A to 6D are display examples of the image according to the first embodiment of the present disclosure.
Figure 6B:
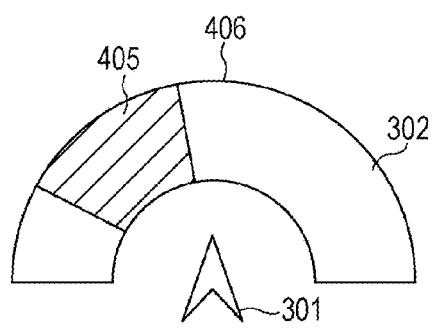
Figure 6C:
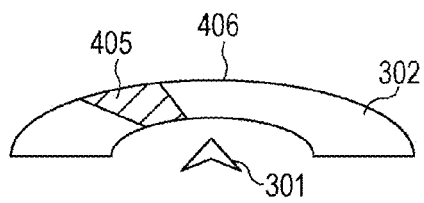
Figure 6D:
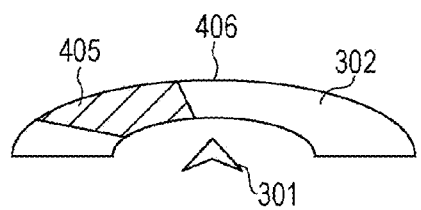

In step S009, on the basis of the control information from the display controller 402, the displayer 500 generates the graphics (e.g., the graphics 301 and 302) and displays the graphics on the display. FIGS. 6A to 6D illustrate specific examples of the graphics displayed on the display. FIG. 6A illustrates a display example of the graphics 301 and 302 (examples of a first graphic) when the recognition accuracy is a high accuracy, and FIG. 6B illustrates a display example of the graphics 301 and 302 (examples of a second graphic) when the recognition accuracy is a low accuracy. In FIGS. 6A and 6B, for example, the highlighted region 405 has a mode in which the entire region thereof is painted with yellow, red, or the like, whereas the non-highlighted region(s) 406 has a mode in which the entire region thereof is painted with gray or the like. A projection transform or the like may be applied to the graphics 301 and 302 in FIG. 6A and the graphics 301 and 302 in FIG. 6B to display the graphics illustrated in FIGS. 6C and 6D.

The graphics 301 and 302 displayed above and illustrated in FIGS. 6A to 6D are displayed, for example, on an HUD 602 (one example of the display), as illustrated in FIGS. 7A and 7B. FIGS. 7A and 7B correspond to cases in which a pedestrian 604 who exists in the vicinity of a white line 603 is recognized in the forward-view image 601: FIG. 7A illustrates a case in which the recognition accuracy is a high accuracy (e.g., in the case of fine weather), and FIG. 7B illustrates a case in which the recognition accuracy is a low accuracy (e.g., in the case of rainy weather). In FIGS. 7A and 7B, highlighted regions 405 indicate the position where the pedestrian 604 exists. Since the highlighted region 405 in FIG. 7A has a smaller display width than the highlighted region 405 in FIG. 7B, the driver is provided with information with a higher resolution. Hence, in the case of FIG. 7A, the driver can recognize a more specific direction in which the pedestrian 604 is present, compared with the case of FIG. 7B.

As described above, the present embodiment has the feature that the detection range graphic including the highlighted region indicating the direction in which an object exists is displayed on the display at all times, and the display width of the highlighted region is changed according to the recognition accuracy. This allows the driver of the vehicle to intuitively recognize, at all times, the direction in which an object exists and the recognition accuracy. As a result, the driver can perform driving and operation without excessively relying on the display system.

Also, the present embodiment has a feature that, even when the results (e.g., the relative angles) of the object recognition performed by the recognizer 200 are the same, the display width of the highlighted region is changed according to the recognition accuracy. This makes it possible to display the direction in which an object exists by using a low resolution when the recognition accuracy is low or a high resolution when the recognition accuracy is high.

Although the first embodiment of the present disclosure has been described thus far, the present disclosure is not limited to the first embodiment, and various modifications are possible thereto. Modifications will be described below.

(Modification 1)

Figures 8A, 8B:
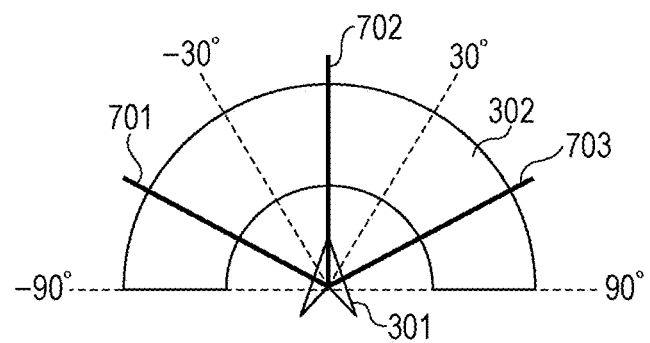
FIGS. 8A and 8B illustrate examples of a table and a display direction according to the first embodiment of the present disclosure.

Although the direction that is offset by the relative angle from the reference straight line 501 with the graphic 301 being used as its center (i.e., the direction indicated by the straight line 503) is determined to be the display direction in the above-described embodiment, the determination of the display direction is not limited thereto. Modifications of the process for the display-direction determination will now be described with reference to FIG. 8A. FIG. 8A illustrates an example of a table used for the display-direction determination. This table is pre-stored by the display controller 402 (or a storage unit, not illustrated). In this table, conditions of a relative angle A and angles of the display directions (straight lines indicating the display directions) are associated with each other. For example, when the relative angle A included in the recognition result information indicates −40 degrees, the display controller 402 determines the direction indicated by a straight line 701 to be a display direction. In such a manner, in this modification, template straight lines (the straight lines 701 to 703 in the example illustrated in FIG. 8A) are prepared according to the relative angle A, thereby making it possible to reduce the amount of load involved in the process for the display-direction determination. Also, since the number of patterns of the highlighted region 405 set based on the determined display direction is limited, what is displayed can be simplified to allow the driver to easily recognize the highlighted region 405. In addition, variations in the recognition result are compensated for, and flicker in the display is reduced, thereby making it possible to reduce visual annoyance.

(Modification 2)

A method that is different from the above-described embodiment and modification 1 may also be used to determine the display direction. An example of such a method will be described with reference to a graphic 302 illustrated in FIG. 8B. For example, when the vehicle is traveling in the center lane of three parallel lanes, and another vehicle is traveling ahead in the same lane as an object to be recognized, the display controller 402 determines the direction indicated by a straight line 702 to be a display direction. Also, when another vehicle is traveling ahead in the right lane, the display controller 402 determines the direction indicated by a straight line 703 to be a display direction. Also, when another vehicle is traveling ahead in the left lane, the display controller 402 determines the direction indicated by a straight line 701 to be a display direction.

(Modification 3)

Figure 9A:
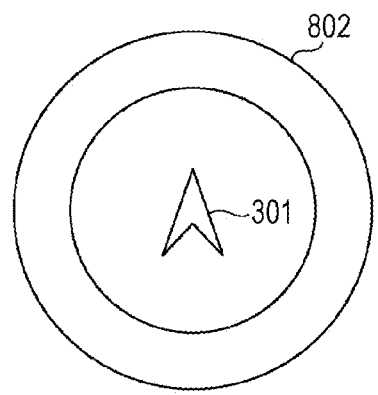
FIGS. 9A to 9E illustrate display examples of the image according to the first embodiment of the present disclosure.
Figure 9B:
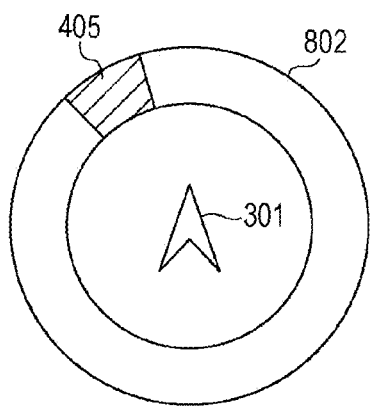
Figure 9D:
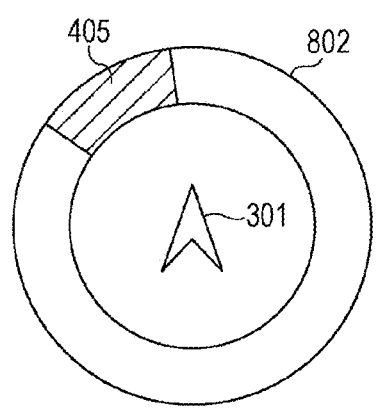
Figure 9C:
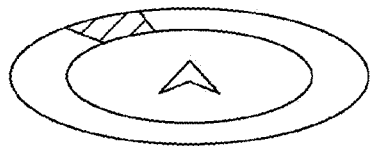
Figure 9E:
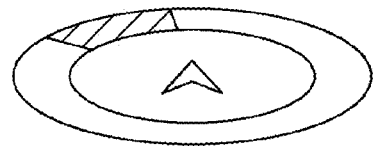

Although the detection range graphic in which the highlighted region is displayed is semicircular (e.g., see the graphic 302 in FIG. 4) in the above-described embodiment, the shape of the detection range graphic is not limited thereto. For example, use of a sensor that can sense the sides and rear of the vehicle in addition to the front of the vehicle as the sensor 100 makes it possible to detect objects in all directions in the surroundings of the vehicle. In such a case, for example, an annular graphic 802 (one example of the detection range graphic) indicating the vehicle and its surroundings in all directions may also be used, as illustrated in FIG. 9A. FIGS. 9B and 9D each illustrate an example in which the highlighted region 405 is displayed in the graphic 802. FIG. 9B illustrates a display example when the recognition accuracy is a high accuracy, and FIG. 9D illustrates a display example when the recognition accuracy is a low accuracy. A projection transform or the like may be applied to the graphics 301 and 802 in FIG. 9B and the graphics 301 and 802 in FIG. 9D to display the graphics illustrated in FIGS. 9C and 9E.

(Modification 4)

In order to further enhance the recognition accuracy, for example, the display system 10 may also be configured to have a plurality of types of sensors, such as a millimeter-wave sensor, a camera, and a laser radar, as the sensor 100. In this case, the calculator 300 may calculate the recognition accuracy such that the larger the number of types of sensors that operate, the higher the recognition accuracy is. The calculator 300 may also calculate the recognition accuracy on the basis of the number of sensors that are operating properly or the number of sensors that are out of order among the plurality of sensors.

(Modification 5)

Since the width of the highlighted region is changed according to the recognition accuracy, the area of the highlighted region may change as a consequence. In such a case, the area of the highlighted region is not intended to indicate the degree of risk (the possibility that the vehicle collides with an object, also called the degree of urgency). However, for example, when the area of the highlighted region increases, it may give the occupant an erroneous impression, that is, an impression that the degree of risk has increased. Accordingly, when the area of the highlighted region changes from a small area to a large area, the display controller 402 may perform control such that the luminance of the highlighted region after the change is lower than the luminance of the highlighted region before the change. For example, when the recognition accuracy decreases during display of the graphic 302 illustrated in FIG. 6A, and the graphic 302 being displayed is switched to the graphic 302 illustrated in FIG. 6B, the display controller 402 performs control such that the luminance of the highlighted region 405 in FIG. 6B is lower than the luminance of the highlighted region 405 in FIG. 6A. On the other hand, when the area of the highlighted region changes from a large area to a small area, the display controller 402 may perform control such that the luminance of the highlighted region after the change is higher than the luminance of the highlighted region before the change. For example, when the recognition accuracy increases during display of the graphic 302 illustrated in FIG. 6B, and the graphic 302 being displayed is switched to the graphic 302 illustrated in FIG. 6A, the display controller 402 performs control such that the luminance of the highlighted region 405 in FIG. 6A is higher than the luminance of the highlighted region 405 in FIG. 6B. As a result of such control, it is possible to avoid giving the occupant the above-noted erroneous impression.

(Modification 6)

Although, in the above-described embodiment, the determiner 401 compares the recognition accuracy with the threshold to thereby make the binary determination as to whether the recognition accuracy is a high accuracy or low accuracy, the present disclosure is not limited thereto. For example, a plurality of thresholds may also be used to determine the recognition accuracy with three values or more. This makes it possible to increase the number of patterns of the display width and makes it possible to inform the driver of a more specific recognition accuracy. The driver can also be more specifically informed of the direction in which an object exists.

(Modification 7)

Although an example in which the determiner 401 determines whether the recognition accuracy is high or low and the display controller 402 determines the display width on the basis of the determination has been described in the above embodiment, the present disclosure is not limited thereto. For example, the determiner 401 may determine the display width. For example, the determiner 401 may determine the display width on the basis of the recognition accuracy value from the calculator 300 and a table in which recognition accuracy values and display widths are associated with each other and may output the determined display width to the display controller 402 as the determination result information. Alternatively, for example, the determiner 401 may calculate the display width by using a predetermined mathematical expression for determining a display width by using the recognition accuracy value calculated by the calculator 300 and may output the calculated display width to the display controller 402 as the determination result information. The display controller 402 may also be configured so as to directly receive the recognition accuracy value from the calculator 300, to thereby allow the display controller 402 to perform the processing in this modification (in this case, the determiner 401 can be eliminated from the configuration).

(Modification 8)

The color of the reference position graphic (e.g., the graphic 301) may also be changed depending on whether or not an object is detected by the sensor 100. For example, when no object is detected, the display controller 402 displays the reference position graphic by using a color (e.g., blue or green) that gives the driver an impression that the degree of risk is low. On the other hand, when an object is detected, the display controller 402 displays the reference position graphic by using a color (e.g., yellow or red) that gives the driver an impression that the degree of risk is high.

(Modification 9)

The color of the highlighted region 405 may also be changed according to the distance between the vehicle and an object in the vehicle traveling direction. For example, the display controller 402 performs control so as to use yellow when the distance is larger than or equal to a predetermined value and so as to use red when the distance is smaller than the predetermined value.

(Modification 10)

Even when the sensor 100 is of the same type, the range that can be sensed is different from sensor to sensor. For example, when the sensor 100 is a camera, it may have a small detection range (e.g., 10 degrees horizontally at each side centered on the forward direction) or may have a large detection range (e.g., 30 degrees horizontally at each side centered on the forward direction), depending on a difference in the lens used. Accordingly, the overall shape of the detection range graphic may be changed so as to indicate the sensing range. An example of such an arrangement will be described using the graphic 302 illustrated in FIG. 4. For example, when the sensing range is small, the angle of the graphic 302 is reduced to change the overall shape thereof to a more acute circular-sector shape. This allows the driver to intuitively recognize that the sensing range is small.

(Modification 11)

For example, when the recognizer 200 recognizes a plurality of objects, the calculator 300 and the determiner 401 may calculate and determine the recognition accuracies for the respective objects. In addition, for example, in accordance with the calculated recognition accuracy and the determined recognition accuracy of an object whose recognition accuracy is lower, the display controller 402 may determine the display width, the display direction, the range of the highlighted region, and the display modes.

(Modification 12)

Only the detection range graphic (e.g., the graphic 302 or the graphic 802) may be displayed without displaying the reference position graphic (e.g., the graphic 301).

(Modification 13)

Although the description in the above embodiment has been given of a case in which the reference position is the position of the sensor 100 and the display direction determined based on the reference position is used as a direction whose reference is the position of the sensor 100, the present disclosure is not limited thereto. For example, the display direction may be corrected to a direction whose reference is the position of the driver. For example, after the straight line 503 is determined as described in the above embodiment, the straight line 503 may also be corrected based on the relative angle of the position of the sensor 100 to the position of the driver. The position of the driver refers to, for example, the driver's seat position or the driver's head position. Thus, as a result of the correction, the display direction indicated by the corrected straight line 503 is a direction whose reference is the position of the driver. Hence, the highlighted region set based on the display direction becomes closer to a direction viewed from the driver.

(Modification 14)

Although an example in which the display-direction determination process (step S006) is performed after the display-width determination process (step S004 or S005) has been described in the above embodiment, the order of the processes is not limited thereto. The display-width determination process may be performed after the display-direction determination process, or the display-width determination process and the display-width determination process may be performed in parallel.

(Modification 15)

Figure 18A:
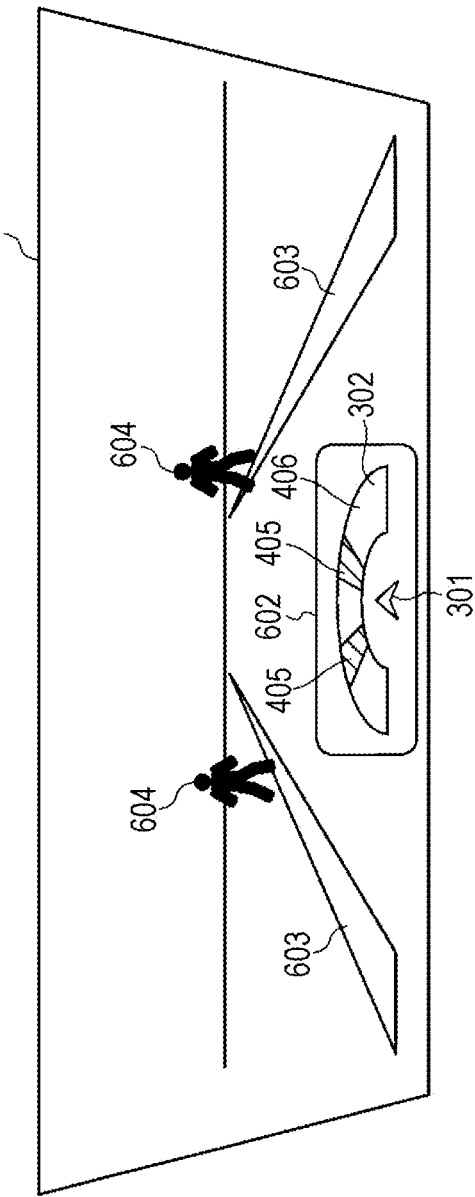
FIGS. 18A and 18B illustrate examples of the occupant's field of view and a displayed image according to modification 15 of the first embodiment of the present disclosure.
Figure 18B:
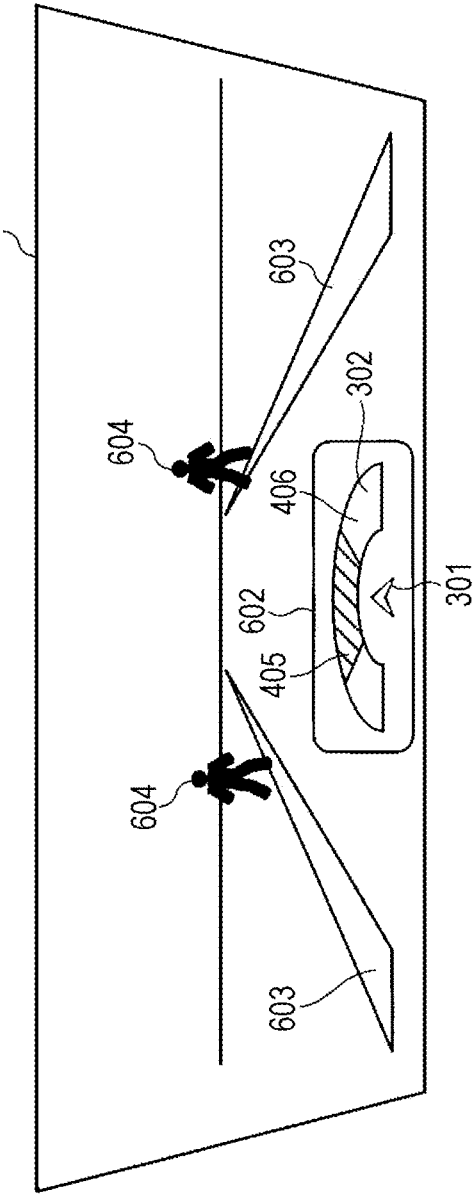

A case in which the recognizer 200 recognizes a single object has been described in the above embodiment. However, when the recognizer 200 recognizes a plurality of objects, the display controller 402 may also highlight a plurality of regions. Examples in this case are illustrated in FIGS. 18A and 18B. For example, as illustrated in FIG. 18A, when two pedestrians 604 are recognized, highlighted regions 405 corresponding to the respective pedestrians 604 may also be displayed. However, when a plurality of highlighted regions exist, as illustrated in FIG. 18A, there is a possibility that it is difficult for the driver to understand what is displayed and to associate what is displayed with pedestrians in the real world. Thus, when a non-highlighted region 406 between the highlighted regions 405 illustrated in FIG. 18A is smaller than a predetermined size, the non-highlighted region 406 and the highlighted regions 405 may be combined together and displayed as a single highlighted region 405 by displaying the non-highlighted region 406 with a highlighted color, as illustrated in FIG. 18B. This allows the driver to quickly understand the general situation of objects in the surroundings.

Second Embodiment

Figure 10:
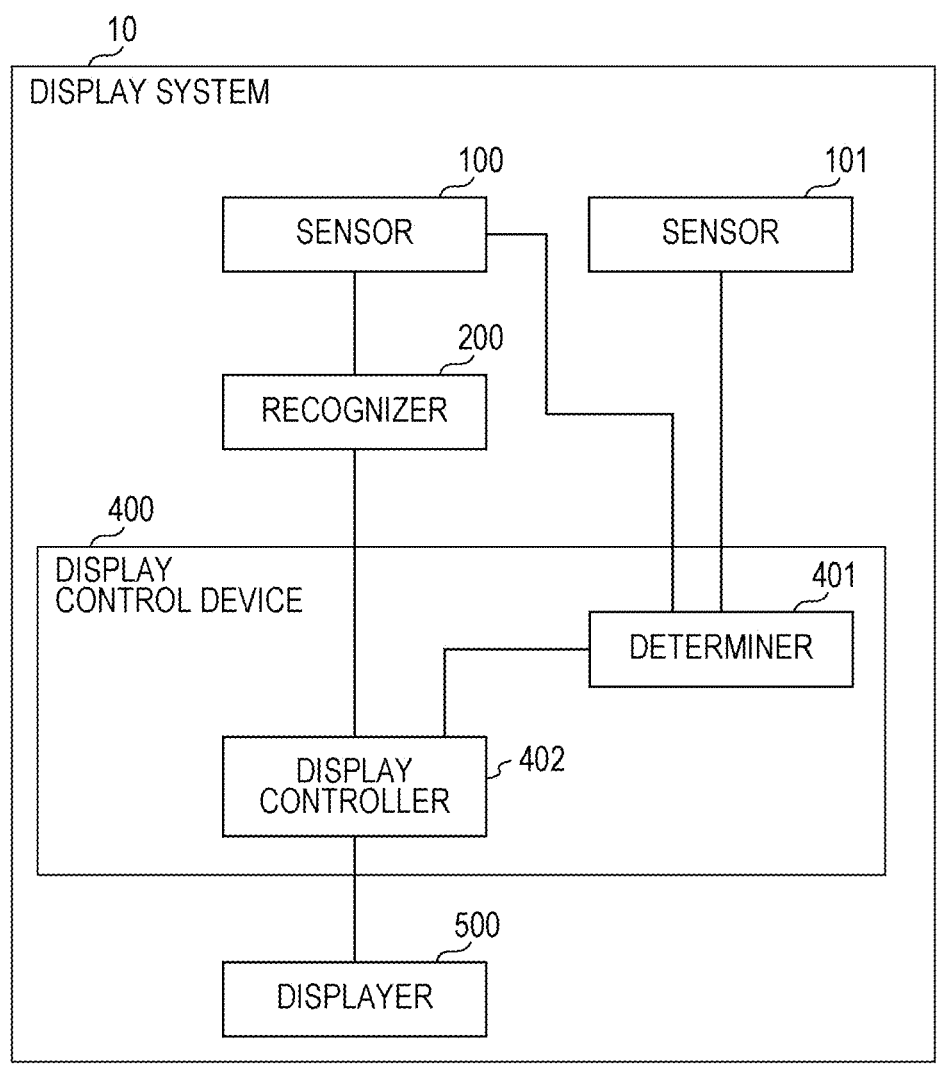
FIG. 10 is a block diagram illustrating an example configuration of a display system according to a second embodiment of the present disclosure.

A second embodiment of the present disclosure will be described with reference to FIG. 10. FIG. 10 is a block diagram illustrating an example configuration of a display system 10 according to the second embodiment. FIG. 10 is different from FIG. 1 in that the display system 10 further has a sensor 101 and does not have the calculator 300. Since constituent elements in FIG. 10 are the same as or similar to those described with reference to FIG. 1, detailed descriptions thereof are not given hereinafter.

The sensor 100 is, for example, a sensing camera. The sensor 100 detects the surroundings of a vehicle and outputs a result of the detection to the determiner 401.

Also, the sensor 101 is, for example, a raindrop sensor or an illuminance sensor and can detect a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel). The sensor 101 detects bad weather due to rain, fog, or snow or an illuminance change due to backlight, illumination light from another vehicle, traveling at night, or traveling in a tunnel and outputs a result of the detection to the determiner 401.

When the sensor 101 does not detect bad weather or an illuminance change, the determiner 401 determines that the recognition accuracy of the sensor 100 is a first recognition accuracy. Also, when the sensor 101 detects bad weather or an illuminance change, the determiner 401 determines that the recognition accuracy of the sensor 100 is a second recognition accuracy lower than the first recognition accuracy.

When the recognizer 200 recognizes a predetermined object, and the determiner 401 determines that the recognition accuracy of the sensor 100 is the first recognition accuracy, the display controller 402 controls the displayer 500 so as to generate a predetermined image that shows a graphic having a predetermined shape, divided into n regions (n is an integer greater than or equal to 2), and indicating a positional relationship between the predetermined object and the vehicle, when displayed on a display medium. Also, when the recognizer 200 recognizes a predetermined object, and the determiner 401 determines that the recognition accuracy of the sensor 100 is the second recognition accuracy, the display controller 402 controls the displayer 500 so as to generate a predetermined image that shows a graphic having a predetermined shape and undivided or divided into m regions (m is an integer that is greater than or equal to 2 and that is smaller than n) when displayed on the display medium.

As described above, the present embodiment can offer substantially the same advantages as those in the first embodiment described above. The modifications described in the first embodiment may also be applied to the present embodiment, as appropriate.

Third Embodiment

A third embodiment of the present disclosure will be described with reference to the accompanying drawings.

When the position or the area of the highlighted region changes according to the recognition accuracy, the driver may experience visual annoyance, depending on the position of the display. In particular, in the case of an HUD, since the display thereof is in many cases installed in the vicinity of a portion immediately ahead of the driver so as to allow the driver to view information on the display with a small amount of movement of his or her line-of-sight, the driver may experience greater visual annoyance. Accordingly, in the present embodiment, control is performed so as to reduce the visual annoyance when the position or the area of the highlighted region changes according to the recognition accuracy.

Figure 11:
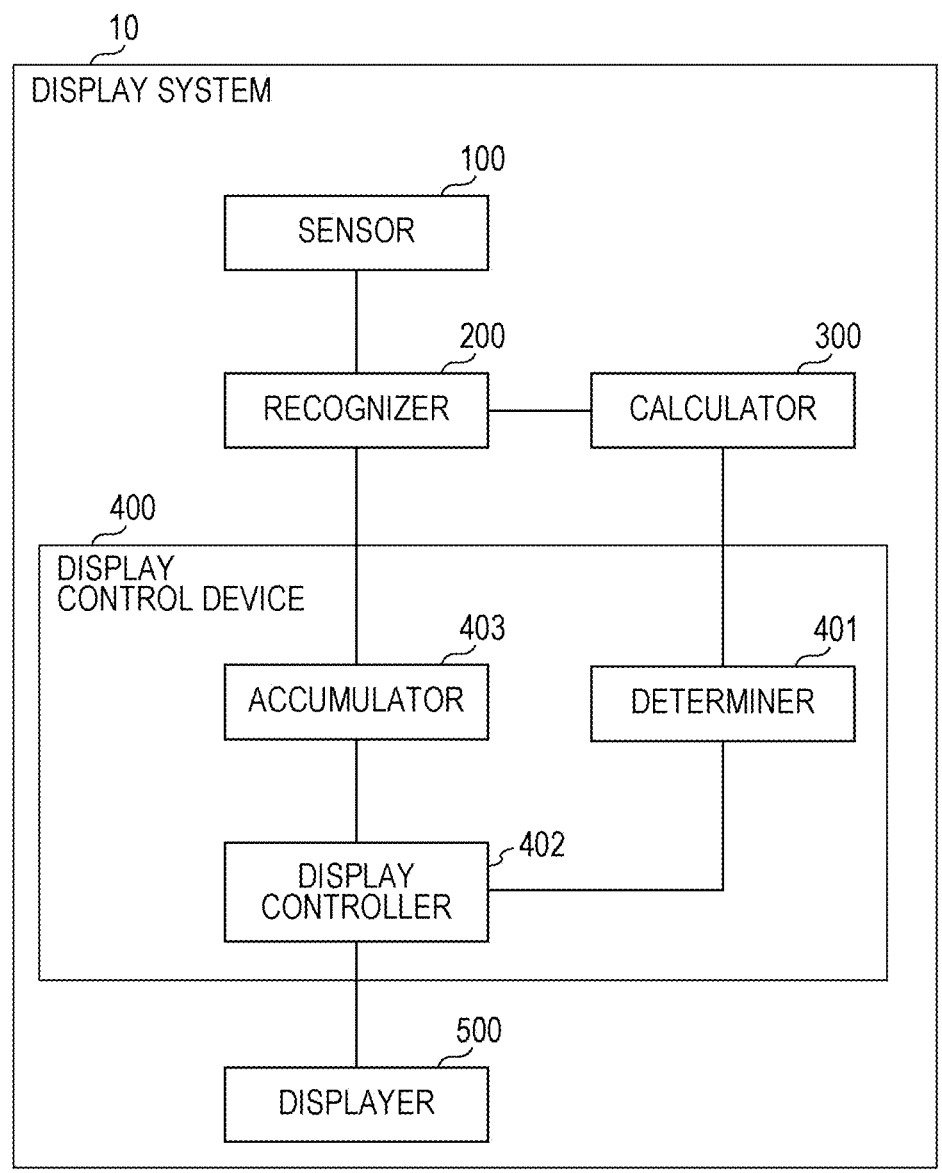
FIG. 11 is a block diagram illustrating an example configuration of a display system according to a third embodiment of the present disclosure.

First, an example configuration of a display system 10 according to the present embodiment will be described with reference to FIG. 11. FIG. 11 is a block diagram illustrating an example configuration of the display system 10 according to the present embodiment. FIG. 11 is different from FIG. 1 in that the display control device 400 further has an accumulator 403. Hereinafter, differences from the first embodiment are mainly described, and descriptions of points that are the same as or similar to those in the first embodiment are not given.

The accumulator 403 is a ring buffer. The accumulator 403 accumulates the recognition result information from the recognizer 200 for a predetermined time and outputs the accumulated recognition result information to the display controller 402. For example, when the sensor 100 is a sensing camera, and the recognition result information is output from the recognizer 200 at 15 fps, the accumulator 403 accumulates the recognition result information for the last 1 second (i.e., the recognition result information for 15 frames) and outputs the recognition result information to the display controller 402.

In addition to the processing operations described above in the first embodiment, the display controller 402 performs the processing operations described below.

The display controller 402 smoothes the recognition result information (e.g., the relative angle) from the accumulator 403. For example, the display controller 402 may smooth the recognition result information by determining the average value or the median of a plurality of pieces of recognition result information. On the basis of the smoothed recognition result information, the display controller 402 performs the display-direction determination process described above in the first embodiment.

The display controller 402 also controls the displayer 500 so as to smooth the highlighted region by using a predetermined smoothing filter. That is, the display controller 402 outputs, to the displayer 500, control information including information of the set range of the highlighted region, the determined display modes, and a smoothing execution instruction (including designation of a smoothing filter). Examples of the smoothing filter used include a smoothing filter having a size of a predetermined range (e.g., 3×3 pixels or 5×5 pixels) having its center at a pixel of interest or a weighted smoothing filter, such as a Gaussian filter weighted for each pixel.

Figure 12:
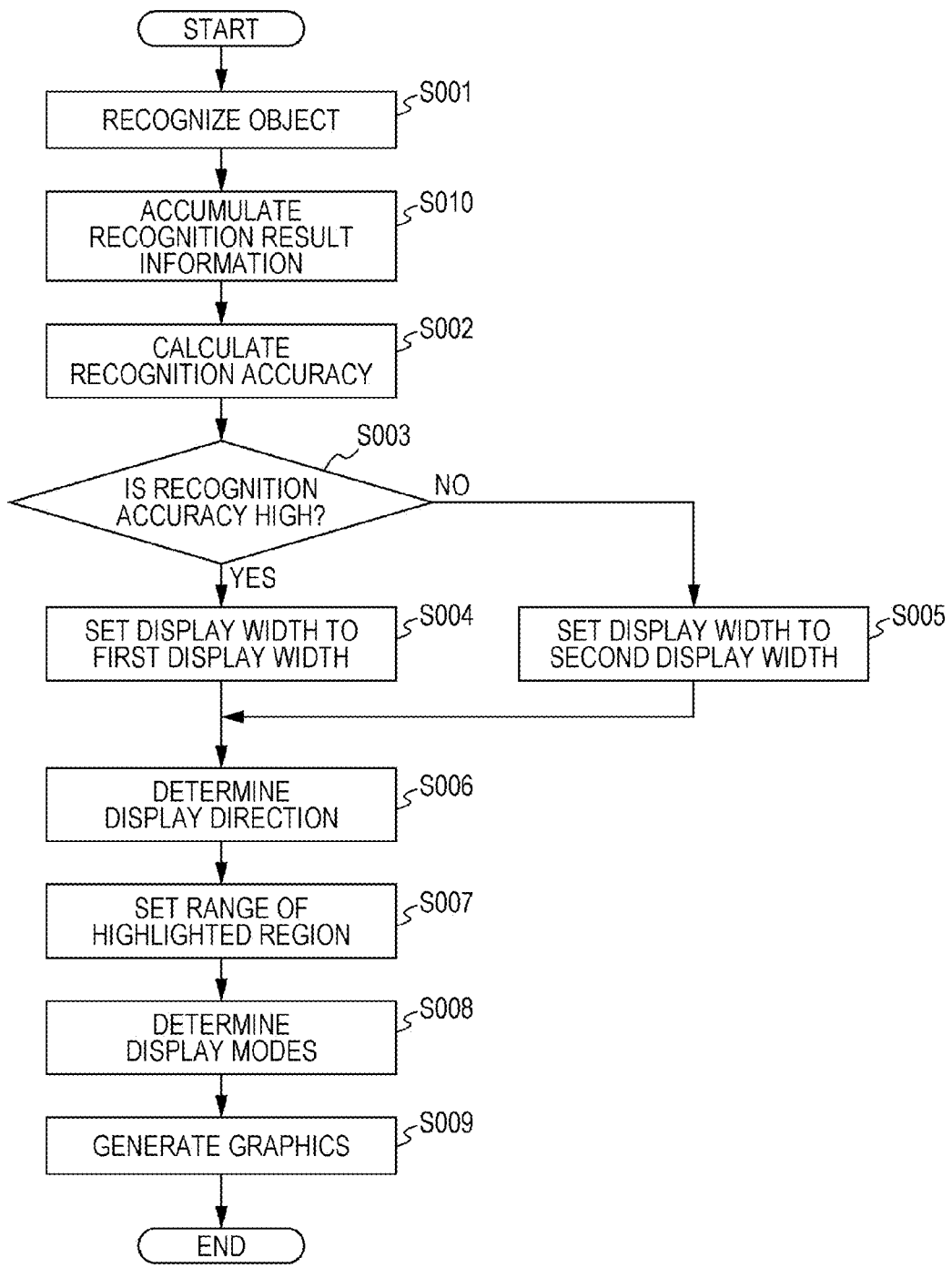
FIG. 12 is a flowchart illustrating an example operation of the display system according to the third embodiment of the present disclosure.

Next, an example operation of the display system 10 according to the present embodiment will be described with reference to FIG. 12. FIG. 12 is a flowchart illustrating an example operation of the display system 10 according to the present embodiment. Hereinafter, differences from the first embodiment are mainly described, and descriptions of points that are the same as or similar to those in the first embodiment are not given.

In step S010, the accumulator 403 accumulates the recognition result information from the recognizer 200 for a predetermined time and outputs the recognition result information to the display controller 402.

In step S006, the display controller 402 smoothes the recognition result information (e.g., the relative angle) from the accumulator 403 and determines the display direction on the basis of the smoothed recognition result information.

When the highlighted-region range setting in step S007 and the display-mode determination in step S008 are finished, the display controller 402 outputs control information to the displayer 500. This control information is information for controlling the displayer 500 so as to generate a graphic on the basis of the set highlighted region range and the determined display modes, to smooth the highlighted region by using a predetermined smoothing filter, and to display the result of the smoothing on the display.

Figure 13A:
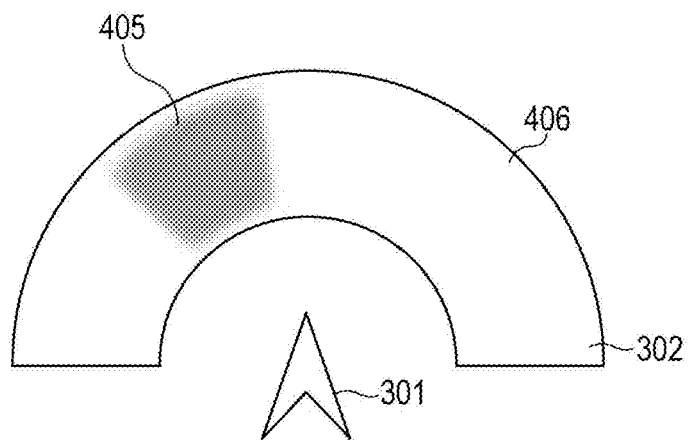
FIGS. 13A and 13B illustrate display examples of an image according to the third embodiment of the present disclosure.
Figure 13B:
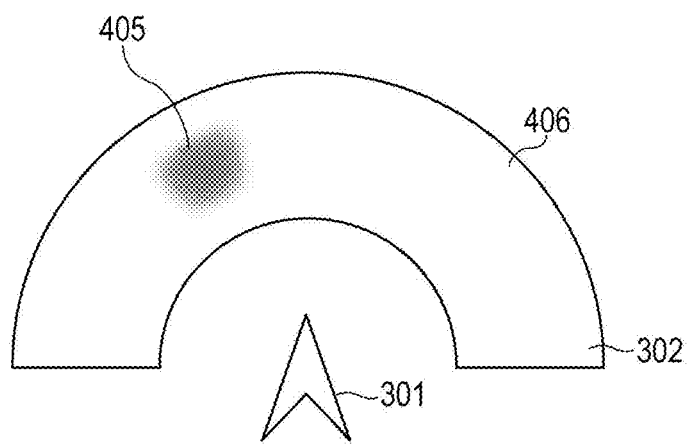

In step S009, the displayer 500 generates the graphic on the basis of the control information from the display controller 402, smoothes the highlighted region, and displays the result of the smoothing on the display. FIGS. 13A and 13B illustrate specific examples of the result displayed on the display. FIG. 13A illustrates a display example when smoothing processing is performed on only edges in specific directions (edges in the above-described positive and negative directions) in the highlighted region 405. FIG. 13B illustrates a display example when the smoothing processing is performed on all edges of the highlighted region 405 (or on the entire highlighted region 405). In this case, the smoothing processing is performed assuming that all edges of the highlighted region 405 are surrounded by the non-highlighted region 406.

As described above, the present embodiment has the feature that the recognition result information accumulated for a predetermined time is smoothed, and the display direction is determined based on the smoothed recognition result information. This makes it possible to prevent the position of the highlighted region from being greatly changed by a sudden change due to a variation in the object recognition result and makes it possible to reduce the visual annoyance experienced by the driver.

The present embodiment also has a feature that predetermined edges in the highlighted region are smoothed. This makes it possible to reduce flicker or blur at the edges when the highlighted region changes and makes it possible to reduce the visual annoyance experienced by the driver.

Although the third embodiment of the present disclosure has been described above, the present disclosure is not limited to the third embodiment described above, and various changes and modifications can be made thereto. For example, each modification described above in the first embodiment and/or the second embodiment may also be applied to the third embodiment, as appropriate.

Fourth Embodiment

A fourth embodiment of the present disclosure will be described with reference to the accompanying drawings.

Figure 15:
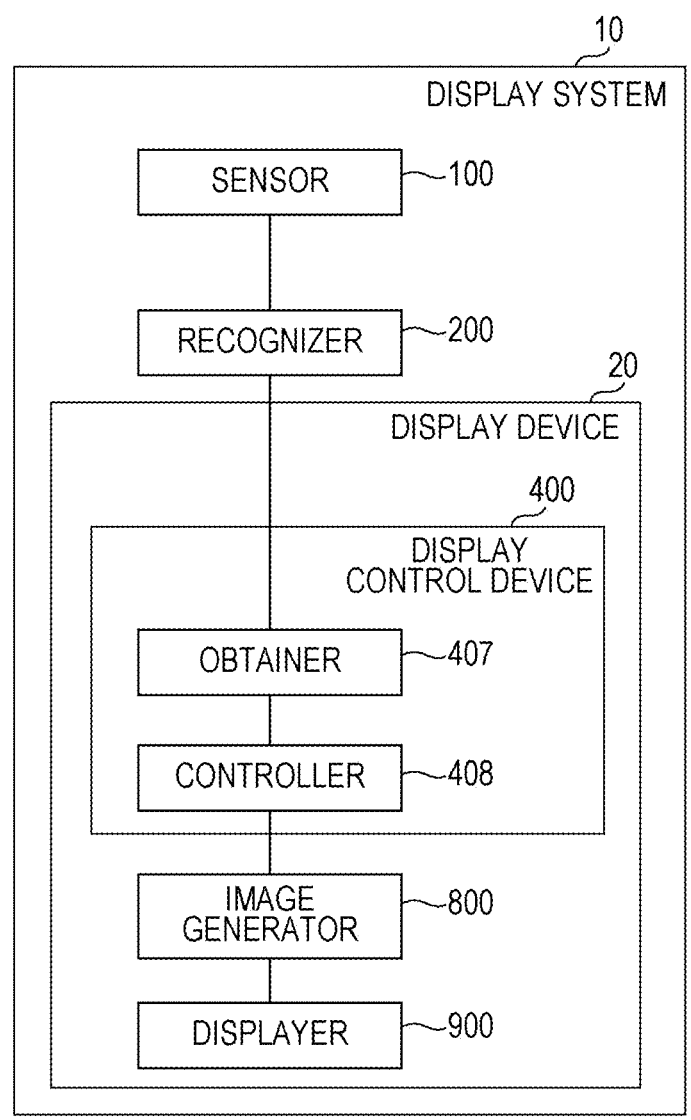
FIG. 15 is a block diagram illustrating an example configuration of a display system according to a fourth embodiment of the present disclosure.

FIG. 15 is a block diagram illustrating an example configuration of a display system 10 according to the present embodiment.

In FIG. 15, the display system 10 includes a sensor 100, a recognizer 200, and a display device 20. The display control device 400 has an obtainer 407 and a controller 408. The display device 20 has a display control device 400, an image generator 800, and a displayer 900. The obtainer 407 is, for example, an input terminal, a connector, or a signal input portion.

The sensor 100 senses the forward view (the forward field of view) of the driver of a vehicle at predetermined time intervals. The sensor 100 is, for example, a sensing camera. The sensing camera is installed inside or outside the vehicle to capture an image of the forward view of the vehicle. In addition, the sensing camera may capture not only an image of the forward view but also images of the side views. Alternatively, the sensor 100 may be, for example, a radar. The radar is installed inside or outside the vehicle to sense the forward view and so on of the vehicle. The forward view and so on of the vehicle may hereinafter be referred to as "surroundings of the vehicle". The sensor 100 outputs surroundings information indicating a result of the surroundings sensing to the recognizer 200.

On the basis of the surroundings information from the sensor 100, the recognizer 200 recognizes a predetermined object that exists in the surroundings of the vehicle. Examples of the object include a movable body (e.g., a vehicle, a bicycle, or a two-wheeled vehicle) or a pedestrian. The recognition result of the recognizer 200 includes an object type. For example, when the object is a pedestrian, a first type of object type corresponds to a person who is older than or equal to a certain age, and a second type thereof corresponds to a person who is younger than the first type. For example, the first type is an adult, and the second type is a child. Also, for example, when the object is a movable body, a first type of object type corresponds to a vehicle, and a second type thereof corresponds to a two-wheeled vehicle.

Since a technology for determining whether or not one is older than or equal to a predetermined age, such as whether a pedestrian in question is an adult or a child, is known in image recognition technology, a description thereof is not given herein. In addition, since a technology for determining whether a predetermined object is a four-wheeled vehicle or two-wheeled vehicle is also known art in image recognition technology, a description thereof is not given herein.

When the sensor 100 is a sensing camera, the recognizer 200 performs pattern matching or the like on the forward-view information (a forward-view image) to recognize an object. Also, for example, when the sensor 100 is a radar, the recognizer 200 extracts an object from the forward-view information through clustering, machine learning, or the like to recognize an object. Since the object recognition technology for the recognizer 200 is known art, a detailed description thereof is not given herein.

The recognizer 200 outputs recognition information indicating an object recognition result to the display control device 400. This recognition result information includes at least object type information and object position information. The object position information is at least one of the position (X, Y) where an object exists, the angle of an object relative to the traveling direction of the vehicle, the speed of the vehicle relative to an object, an object type, information obtained by pattern matching, information obtained by object tracking processing, and so on. The position (X, Y) where an object exists represents coordinates in a camera coordinate system in which X indicates a horizontal direction, and Y indicates a forward direction, with reference to the point where the sensing camera of the vehicle is installed. Y of the position (X, Y) where an object exists also indicates the distance between the vehicle and the object in the vehicle traveling direction (this distance is hereinafter referred to simply as "distance").

The obtainer 407 in the display control device 400 obtains the recognition result from the recognizer 200. When the display control device 400 is implemented by hardware, the obtainer 407 is an input portion having no substantial function. Examples include a connector and an input terminal.

On the basis of the recognition result, the controller 408 controls the image generator 800 so as to generate a predetermined image that shows a graphic having a predetermined shape when displayed on a display medium. The graphic having a predetermined shape is a graphic in which the display mode of a partial region indicating the direction in which a predetermined object exists and the display mode of another region are different from each other.

When the detected predetermined object is the first type (e.g., an adult), the controller 408 controls the image generator 800 so as to generate a first predetermined image that shows a first graphic having a predetermined shape and including a partial region whose width is a first width when displayed on a display medium. On the other hand, when the detected predetermined object is the second type (e.g., a child) different from the first type, the controller 408 controls the image generator 800 so as to generate a second predetermined image that shows a second graphic having a predetermined shape and including a partial region whose width is a second width larger than the first width when displayed on the display medium.

More specifically, the controller 408 controls the image generator 800 so that the width of the partial region in the graphic having a predetermined shape and displayed on the display medium is reduced, when the detected pedestrian is an adult (the first type), and so that the width of the partial region in the graphic having a predetermined shape is increased, when the pedestrian is a child or the like (the second type).

Figure 16A:
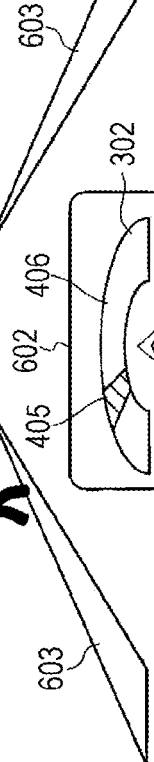
FIGS. 16A to 16B illustrate examples of the occupant's field of view and a displayed image according to the fourth embodiment of the present disclosure.
Figure 16B:
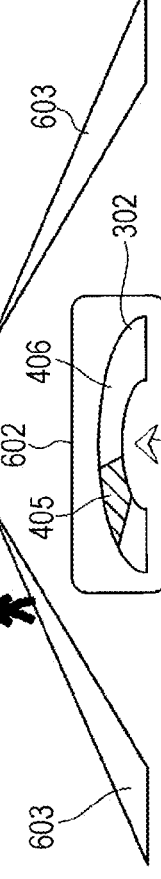

FIGS. 16A and 16B illustrate views ahead of the vehicle and states of a predetermined graphic displayed on a display medium for a case (FIG. 16A) in which the pedestrian 604 is an adult and for a case (FIG. 16B) in which the pedestrian 604 is a child.

The graphics 301 and 302 illustrated in FIGS. 6A to 6D are displayed, for example, on the HUD 602 (one example of the display), as illustrated in FIG. 16A. FIGS. 16A and 16B illustrate cases in which the pedestrians 604 who exist in the vicinity of the white line 603 are recognized in the forward-view image 601: FIG. 16A illustrates a case in which an adult pedestrian who is relatively unlikely to make a sudden move into the road is detected, and FIG. 16B illustrates a case in which a child pedestrian who is relatively likely to make a sudden move into the road is detected. In the case in FIG. 16A, the driver can recognize a more specific direction in which the pedestrian 604 exists, compared with the case in FIG. 16B.

When the detected predetermined object is a pedestrian, there is the possibility that the pedestrian takes an unexpected action, such as changing his or her body's orientation suddenly or moving into the road suddenly, and the lower the age of the subject is, the higher this tendency is. That is, when the age of the detected subject is lower than a predetermined age, that is, when the detected subject is a child, infant, or the like, for example, the possibility of moving into the road suddenly increases. Thus, when the pedestrian is a child (FIG. 16B), the width of the partial region in the graphic having a predetermined shape needs to be increased, compared with a case in which the pedestrian is an adult (FIG. 16A). By doing so, it is possible to give a stronger caution to the driver.

Also, even when the pedestrian is an adult, the driver of the vehicle requires considerable caution, when the pedestrian is facing the road on which the vehicle is traveling. In such a case, the recognition result includes information of the direction in which the pedestrian, who is a predetermined object, is facing, and when a pedestrian of the first type is facing the road on which the movable body is traveling, the controller 408 may also control the image generator 800 so as to generate the second predetermined image.

Also, even when the pedestrian is an adult, the driver requires considerable caution, when the acceleration of the pedestrian toward the road on which the vehicle is traveling has a positive value. In such a case, the recognition result includes information of the acceleration of the pedestrian, who is a predetermined object, and when the acceleration of a pedestrian of the first type toward the road on which the movable body is traveling is positive, the controller 408 may control the image generator 800 so as to generate the second predetermined image.

On the other hand, when the detected predetermined object is a vehicle (a four-wheeled vehicle or two-wheeled vehicle), it is necessary to take measures that are different from those for the pedestrian. Accordingly, when the detected predetermined object is a vehicle, the controller 408 controls the image generator 800 so as to generate a third predetermined image that shows a third graphic having a predetermined shape and including a partial region whose width is a third width when displayed on the display medium. The third width is larger than the first width. The third width may also be substantially the same as the second width. The degree of caution given for a vehicle that suddenly appears from a side road and the degree of caution given for a child who exists on a sidewalk can be made equal to each other.

That is, when changes over time in the position, speed, acceleration, and so on of a detected object are large, it is generally difficult to predict future behavior of the object. Thus, when changes over time in information, such as the position, speed, or acceleration, regarding an object are large, the width of the partial region in the graphic having a predetermined shape may be changed.

The image generator 800 generates a predetermined image on the basis of the control information from the controller 408. The predetermined image is displayed on a display medium by the displayer 900, described below, and represents a graphic having a predetermined shape. The predetermined image may be an image or may be image data. When the displayer 900, described below, has a projector function, the image generator 800 generates an image, and the displayer 900 projects the image. On the other hand, when the displayer 900, described below, has no projector function, the image generator 800 generates image data, and the displayer 900 outputs the image data.

The displayer 900 displays a graphic having a predetermined shape on a display medium by outputting a predetermined image generated by the image generator 800 onto a display (which is not illustrated and is one example of the display medium). The displayer 900 has, for example, a projector function, and directly projects an image onto the display. The display is, for example, the front windshield of a movable body or a transparent combiner provided separately from the windshield. That is, the displayer 900 displays a graphic having a predetermined shape on the windshield by projecting a predetermined image onto the windshield. The occupant in the movable body views the displayed graphic having a predetermined shape as a virtual image. The transparent combiner is, for example, a combiner 801 illustrated in FIG. 19.

The displayer 900 may display a graphic having a predetermined shape, for example, on a display, instead of using the projector function. In such a case, the display is a transmissive display, and the predetermined image generated by the image generator 800 is image data. That is, the displayer 900 displays a graphic having a predetermined shape on a transmissive display by outputting image data onto the transmissive display. Since the principle that image data input to a transmissive display is displayed as a graphic having a predetermined shape is known art, a description thereof is not given herein.

The display medium may also be a hologram. When a hologram is used, a system may be used in which a light guide plate that totally internally reflects and guides a group of parallel light beams that satisfies the total internal reflection condition of a light guide plate is used to emit some of a group of parallel light beams totally internally reflected and guided in the light guide plate, to thereby allow the occupant to view a virtual image. Although image data is not directly projected in a system in which a light guide plate is used, unlike a projector, the description herein is given using the definition "projection" as in the projector system, for convenience of description.

Examples of the display include an LCD, an HUD, an HMD, an eyeglass-type display (smart glasses), a display for navigation, a meter display, and other dedicated displays. The HUD may be, for example, the windshield of the vehicle or a glass surface, a plastic surface, or the like that is additionally provided. For example, the windshield may be the front glass or may be a side window glass or the rear window glass of the vehicle. In addition, the display medium may be a transmissive display, as described above. The transmissive display is, for example, a transmissive organic electroluminescent (EL) display or a transparent display employing glass that emits light upon being illuminated with light having a certain wavelength, and the driver can view what is displayed on the transmissive display, at the same time as viewing the background. The transmissive display is also a display medium that transmits light.

When the display medium is the windshield of a movable body, the displayer 900 displays a graphic having a predetermined shape on the windshield by projecting a predetermined image onto the windshield. When the display medium is a transmissive display, the predetermined image is image data, and the displayer 900 displays a graphic having a predetermined shape on the transmissive display by outputting image data onto the transmissive display. In the present embodiment, "output" is defined as a superordinate concept of "projection", for convenience of description.

The display system 10 may also have a configuration including the above-described display.

The above-described graphics may also be generated by the display control device 400 or another constituent element (not illustrated), not by the image generator 800.

For example, when the predetermined image is projected on a display medium, the occupant in the movable body views a graphic, generated by the display system 10, as a virtual image. In this case, the graphic may also be projected onto the display so as to be superimposed on the occupant's field of view. Since the principle that a driver views a graphic projected on a display as a virtual image is known art, a description thereof is not given herein.

Figure 17:
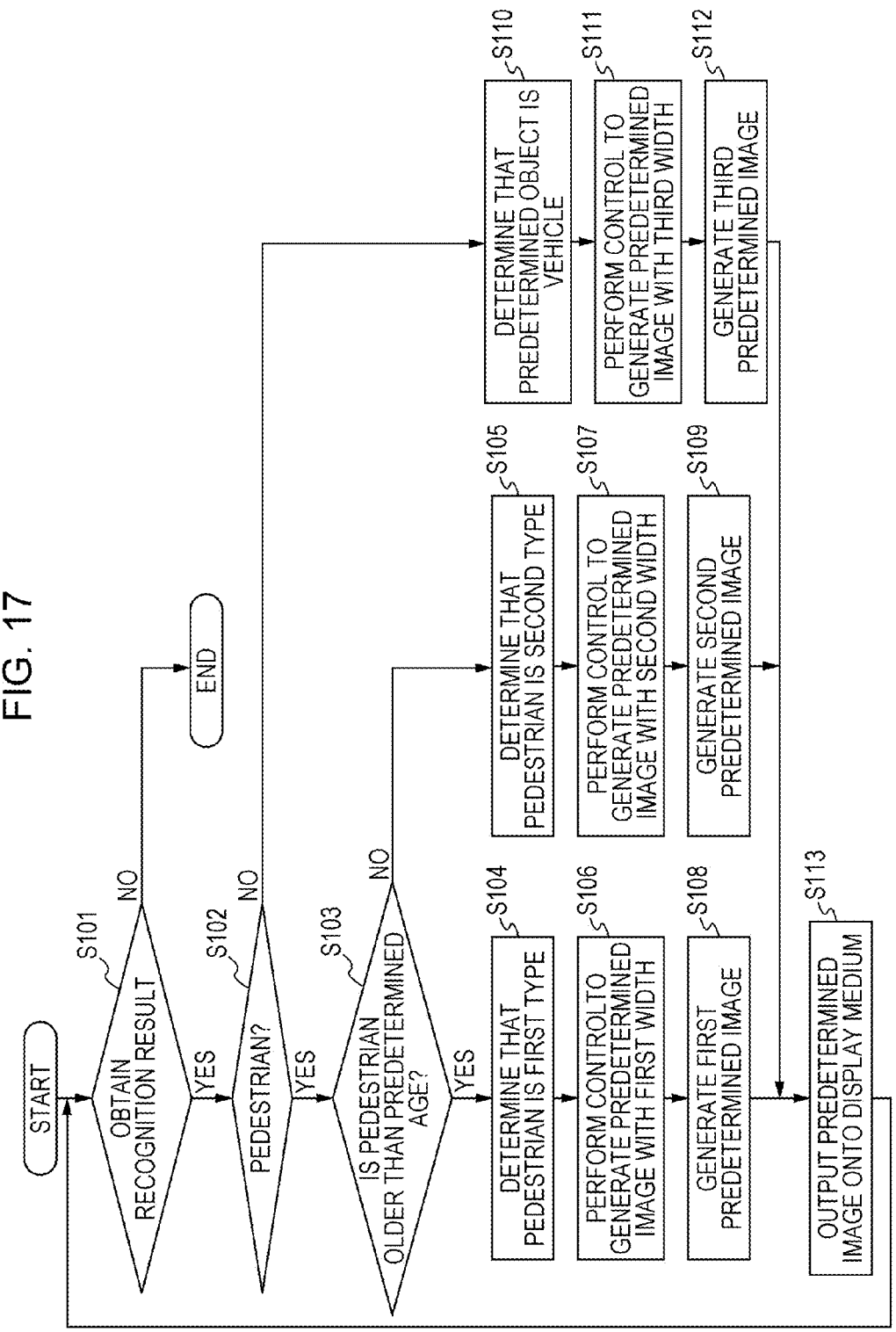
FIG. 17 is a flowchart illustrating an example operation of the display system according to the fourth embodiment of the present disclosure.

FIG. 17 is a flowchart illustrating an example operation of the display control device 400 included in the display system 10 illustrated in FIG. 15. An example operation of the controller 408 will be described with reference to FIGS. 15 and 17.

If the obtainer 407 obtains a recognition result (YES in step S101), the flow proceeds to step S102. If the predetermined object is a pedestrian (YES in step S102), the flow proceeds to step S103.

In step S103, the controller 408 determines whether or not the pedestrian is older than a predetermined age. If the pedestrian is older than the predetermined age (YES in step S103), the flow proceeds to step S104. On the other hand, if the pedestrian is not older than the predetermined age (NO in step S103), the flow proceeds to step S105.

If the pedestrian is older than the predetermined age, in step S104, the controller 408 determines that the pedestrian is the first type. In step S106, the controller 408 controls the image generator 800 so as to generate a first predetermined image that shows a first graphic having a predetermined shape and including a partial region whose width is a first width when displayed on the display medium.

In step S108, the image generator 800 generates the predetermined image (the first predetermined image) on the basis of control performed by the controller 408.

On the other hand, if the pedestrian is not older than the predetermined age, in step S105, the controller 408 determines that the pedestrian is the second type. In step S107, the controller 408 controls the image generator 800 so as to generate a second predetermined image that shows a second graphic having a predetermined shape and including a partial region whose width is a second width larger than the first width when displayed on the display medium.

In step S109, the image generator 800 generates the predetermined image (the second predetermined image) on the basis of control performed by the controller 408.

If the controller 408 determines that the predetermined object is not a pedestrian (NO in step S102), the flow proceeds to step S110.

In step S110, the controller 408 determines that the predetermined object is a vehicle. In step S111, the controller 408 controls the image generator 800 so as to generate a third predetermined image that shows a third graphic having a predetermined shape and including a partial region whose width is a third width when displayed on the display medium. The third width may be determined according to the specifications of the display control device 400 and may be the same as the first width or the second width. The first width and the second width may also be different from each other.

In step S113, the displayer 900 outputs the predetermined image generated by the image generator 800 onto the display medium.

When the predetermined object is a pedestrian, the width of the partial region in the graphic having a predetermined shape is changed according to whether or not the pedestrian is older than a predetermined age, thereby making it possible to raise caution for young pedestrians who are likely to take unexpected actions, such as a sudden move into the road.

Ideally, the predetermined image is the same as the graphic having a predetermined shape. Although the predetermined image and the graphic having a predetermined shape are somewhat different from each other depending on the conditions, such as the degree of curvature of the display medium, they are substantially the same. The predetermined image is generated by the image generator 800, and the graphic having a predetermined shape is displayed on the display medium. The highlighted-region setting described above with reference to FIG. 5 may also be performed only when an object for which caution is to be given exists in the surroundings of the vehicle. That is, in the display system 10 in the present embodiment, setting the highlighted region and displaying the highlighted region on a display medium is not essential processing. Any processing may be used as long as a graphic having a predetermined shape is displayed on a display medium on the basis of the detection accuracy.

Figure 19:
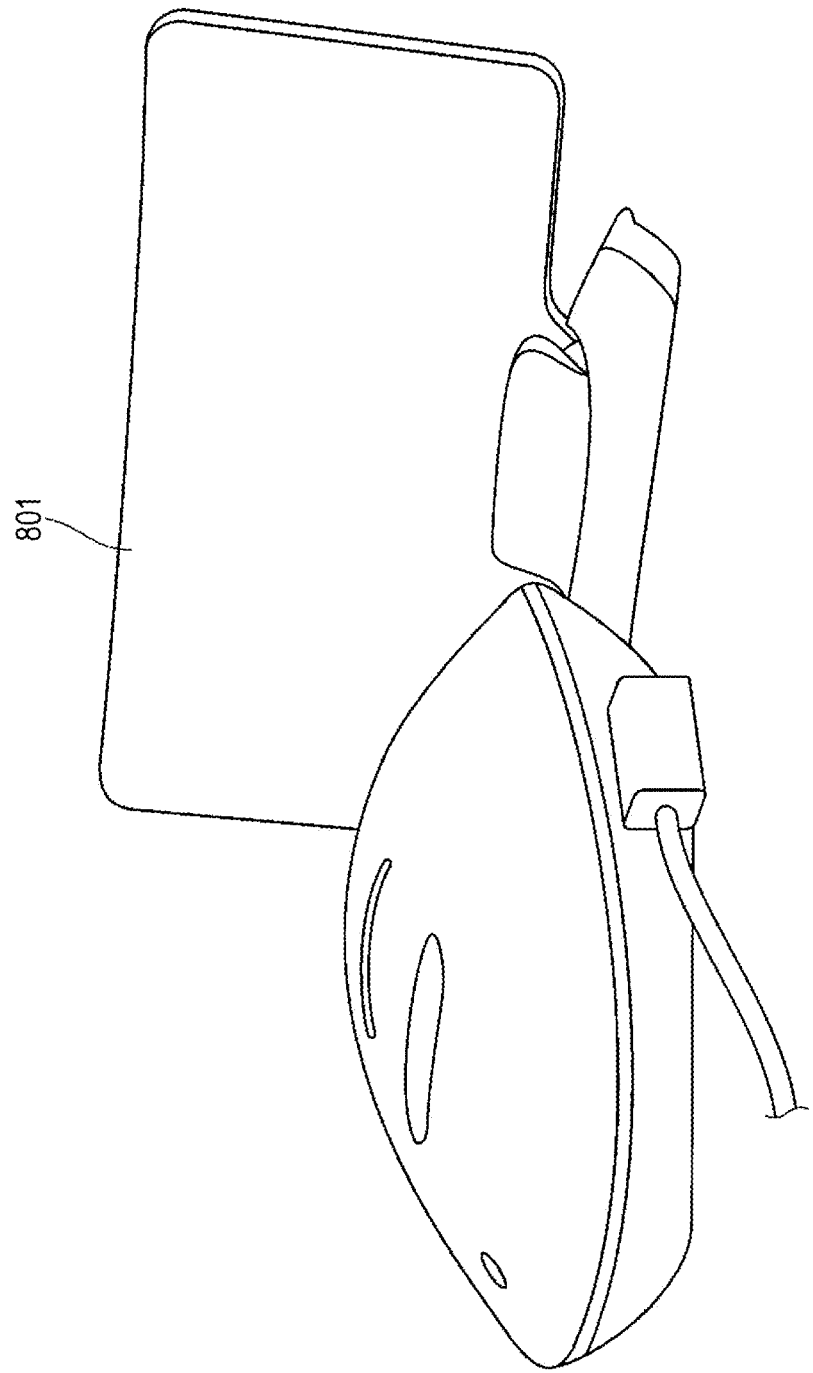
FIG. 19 illustrates one example of a combiner according to the fourth embodiment of the present disclosure.

In the description above, the display device 20 has been described above as having the display control device 400, the image generator 800, and the displayer 900, but the display device 20 may also have a display medium when the display medium is a combiner. FIG. 19 illustrates an example configuration of the display device 20 when the display medium is a combiner. The display device 20 has a combiner 801 serving as a display medium.

Modifications 1 to 15 described in the first embodiment are also applicable to the fourth embodiment.

The functions of the individual constituent elements in the display system 10 and the display control device 400 in each embodiment described above can also be implemented by a computer program.

Figure 14:
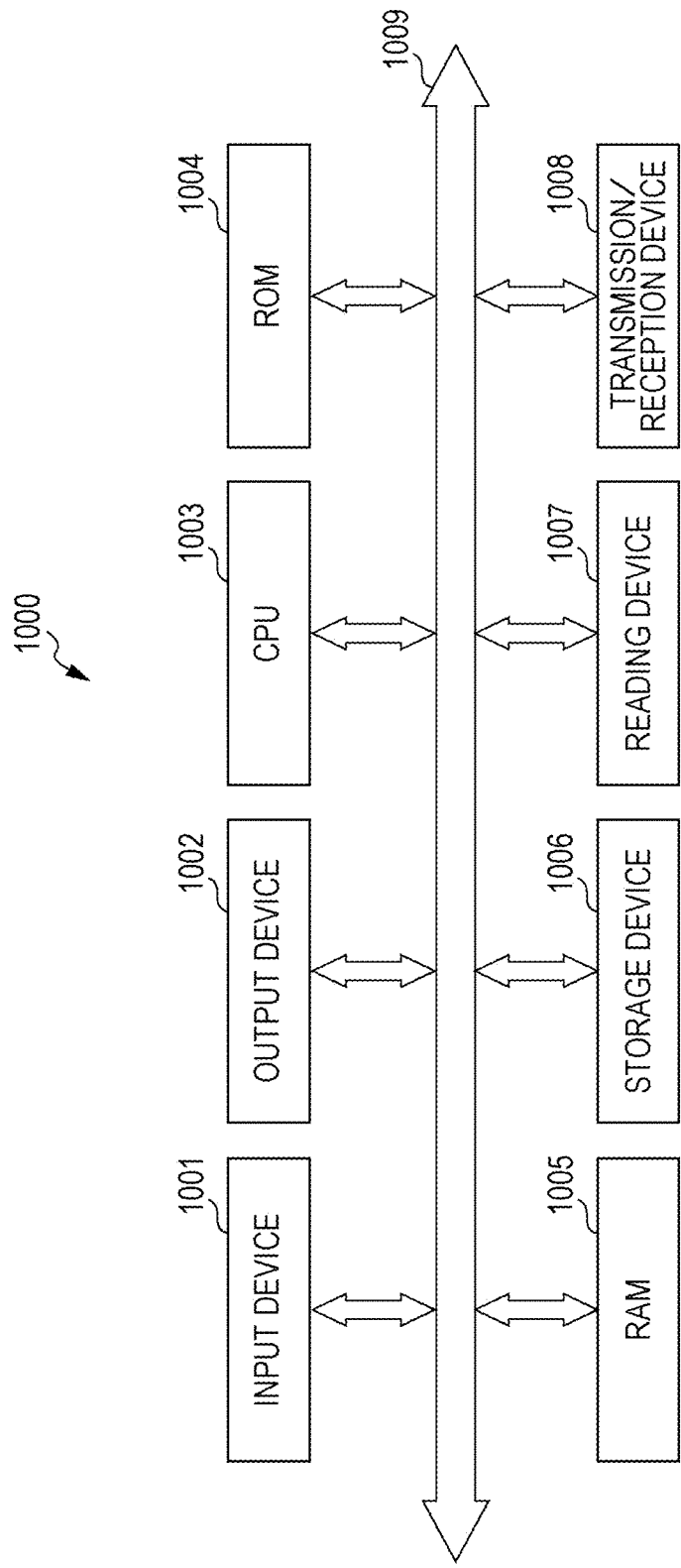
FIG. 14 is a block diagram illustrating a hardware example configuration of the display systems and display control devices according to the first to third embodiments of the present disclosure.

FIG. 14 is a block diagram illustrating a hardware configuration of a computer that realizes the functions of the individual constituent elements by using a program. This computer 1000 includes an input device 1001, such as an input button and/or a touch pad, an output device 1002, such as a display or a speaker, a central processing unit (CPU) 1003, a read only memory (ROM) 1004, a random access memory (RAM) 1005, a storage device 1006, such as a hard-disk device or a solid-state drive (SSD), a reading device 1007 for reading information from a storage medium, such as a digital versatile disk read-only memory (DVD-ROM) or a Universal Serial Bus (USB) memory, and a transmission/reception device 1008 for performing communication over a network. These elements are connected through a bus 1009.

The reading device 1007 reads a program for realizing the functions of the constituent elements described above from a storage medium on which the program is recorded, and the read program is stored in the storage device 1006. Alternatively, the transmission/reception device 1008 communicates with a server apparatus connected to the network, downloads, from the server apparatus, a program for realizing the functions of the constituent elements described above, and stores the downloaded program in the storage device 1006.

The CPU 1003 copies the program stored in the storage device 1006 to the RAM 1005, sequentially reads instructions included in the program from the RAM 1005, and executes the instructions to thereby realize the functions of the constituent elements described above. Also, during execution of the program, information resulting from the various processes described above in each embodiment is stored in the RAM 1005 or the storage device 1006 and is used, as appropriate.

The functional blocks used in the description of the above embodiments may be realized in the form of a large scale integration (LSI), which is an integrated circuit. The functional blocks may be individually integrated into single chips or at least one or all of the functional blocks may be integrated into a single chip. Although the functional blocks are implemented in the form of an LSI in this case, they may also be called an integrated circuit (IC), a system LSI, a super LSI, or an ultra LSI depending on the difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections and settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable to the integration.

The present disclosure is useful for a display control device and a display control method that control display of information provided to a user (e.g., an occupant in a vehicle or the like or a user wearing a display device), a non-transitory storage medium, and a program.

What is claimed is:

1. A display control device in a display system that detects with a sensor a predetermined object that exists in surroundings of a movable body, recognizes the predetermined object based on a detection result of the sensor, generates a predetermined image with an image generator, and displays with a display a graphic having a predetermined shape on a display medium by outputting the predetermined image onto the display medium, the display control device comprising:
   a processor; and
   a memory including instructions that, when executed by the processor, cause the processor to perform operations including:
      obtaining a recognition result of the predetermined object; and
      controlling, with a controller, when the the predetermined object is recognized, the image generator so as to generate the predetermined image that shows the graphic having a predetermined shape when displayed on the display medium, based on the recognition result,
      wherein the graphic having a predetermined shape includes a partial region indicating a direction in which the predetermined object exists, a display mode of the partial region and that of another region being different from each other; and
      wherein, when the predetermined object is a pedestrian, the controller determines whether the pedestrian is a first type or a second type that is younger than the first type; and
      the controller:
         controls the image generator so as to generate a first predetermined image as the predetermined image when the pedestrian is the first type, and
         controls the image generator so as to generate a second predetermined image as the predetermined image when the pedestrian is the second type, and
         wherein the first predetermined image shows, as the graphic having a predetermined shape, a first graphic including a partial region having a first width, and the second predetermined image shows, as the graphic having a predetermined shape, a second graphic including a partial region having a second width that is larger than the first width,
      wherein an angle indicating a direction in which the partial region is to be displayed, is determined based on an angle indicating a direction in which the predetermined object exists, and
      wherein the partial region is determined based on the angle indicating the direction in which the partial region is to be displayed and the first or second width.

2. The display control device according to claim 1, wherein the recognition result includes information of a direction in which the pedestrian's body faces, and when the pedestrian of the first type faces a road on which the movable body is traveling, the controller controls the image generator so as to generate the second predetermined image.

3. The display control device according to claim 1, wherein the recognition result further includes acceleration information of the pedestrian, and when acceleration of the pedestrian of the first type toward a road on which the movable body is traveling is positive, the controller controls the image generator so as to generate the second predetermined image.

4. The display control device according to claim 1, wherein the partial region in the graphic having a predetermined shape is entirely displayed with a first color, or a contour of the partial region displayed with the first color, and the other region in the graphic having a predetermined shape is entirely displayed with a second color, or a contour of the other region displayed with the second color.

5. The display control device according to claim 1, the operations further including:
   accumulating, for a predetermined time, angle information indicating the direction in which the predetermined object exists, wherein the controller:
smooths the accumulated angle information, and
sets the partial region, based on the smoothed angle information and the first width or the second width.

6. The display control device according to claim 1, wherein the controller controls the display so as to smooth a predetermined edge of the partial region.

7. A method of controlling a display of information in a display system that detects with a sensor a predetermined object that exists in surroundings of a movable body, recognizes the predetermined object based on a detection result of the sensor, generates a predetermined image with an image generator, and displays with a display a graphic having a predetermined shape on a display medium by outputting the predetermined image onto the display medium, the method comprising:

obtaining, with a processor, a recognition result of the predetermined object; and controlling, with a controller, when the predetermined object is recognized, the image generator so as to generate the predetermined image that shows the graphic having a predetermined shape when displayed on the display medium, based on the recognition result, wherein the graphic having a predetermined shape includes a partial region indicating a direction in which the predetermined object exists, a display mode of the partial region and that of another region being different from each other; and wherein, when the predetermined object is a pedestrian, the controller determines whether the pedestrian is a first type or a second type that is younger than the first type; and the controller:
controls the image generator so as to generate a first predetermined image as the predetermined image when the pedestrian is the first type, and
controls the image generator so as to generate a second predetermined image as the predetermined image when the pedestrian is the second type, and wherein the first predetermined image shows, as the graphic having a predetermined shape, a first graphic including a partial region having a first width, and the second predetermined image shows, as the graphic having a predetermined shape, a second graphic including a partial region having a second width that is larger than the first width, wherein an angle indicating a direction in which the partial region is to be displayed, is determined based on an angle indicating a direction in which the predetermined object exists, and wherein the partial region is determined based on the angle indicating the direction in which the partial region is to be displayed and the first or second width.

8. A non-transitory computer-readable storage medium encoded with an executable computer program for detecting with a sensor a predetermined object that exists in surroundings of a movable body, recognizing the predetermined object based on a detection result of the sensor, generating a predetermined image with an image generator, and displaying with a display a graphic having a predetermined shape on a display medium by outputting the predetermined image onto the display medium and that, when executed by a processor, causes the processor to perform operations comprising:

obtaining a recognition result of the predetermined object; and controlling, with a controller, when the predetermined object is recognized, the image generator so as to generate the predetermined image that shows the graphic having a predetermined shape when displayed on the display medium, based on the recognition result, wherein the graphic having a predetermined shape includes a partial region indicating a direction in which the predetermined object exists, a display mode of the partial region and that of another region being different from each other; and wherein, when the predetermined object is a pedestrian, the controller determines whether the pedestrian is a first type or a second type that is younger than the first type; and the controller:
controls the image generator so as to generate a first predetermined image as the predetermined image when the pedestrian is the first type, and
controls the image generator so as to generate a second predetermined image as the predetermined image when the pedestrian is the second type, and wherein the first predetermined image shows, as the graphic having a predetermined shape, a first graphic including a partial region having a first width, and the second predetermined image shows, as the graphic having a predetermined shape, a second graphic including a partial region having a second width that is larger than the first width, wherein an angle indicating a direction in which the partial region is to be displayed, is determined based on an angle indicating a direction in which the predetermined object exists, and wherein the partial region is determined based on the angle indicating the direction in which the partial region is to be displayed and the first or second width.

* * * * *